United States Patent
Nagai et al.

(10) Patent No.: US 6,636,587 B1
(45) Date of Patent: Oct. 21, 2003

(54) INFORMATION RECEPTION PROCESSING METHOD AND COMPUTER-TELEPHONY INTEGRATION SYSTEM

(75) Inventors: Yasuhiko Nagai, Tokyo (JP); Susumu Matsui, Machida (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/103,816

(22) Filed: Jun. 24, 1998

(30) Foreign Application Priority Data

Jun. 25, 1997 (JP) .............................. 9-168633

(51) Int. Cl.[7] .............................................. H04M 11/00
(52) U.S. Cl. ................... 379/88.14; 379/87; 379/93.11; 379/118; 379/142.14; 379/88.06; 379/88.25
(58) Field of Search ................................ 370/352, 356, 370/401, 270; 379/88.06, 88.25, 93.11, 87, 142.14, 88.13, 88.14, 88.17, 88.18, 88.19, 88.22, 88.23, 100.03, 118, 67.1, 68

(56) References Cited

U.S. PATENT DOCUMENTS

| | | | | |
|---|---|---|---|---|
| 5,524,137 A | * | 6/1996 | Rhee | 379/88.01 |
| 5,751,791 A | * | 5/1998 | Chen et al. | 379/88.13 |
| 5,790,803 A | * | 8/1998 | Kinoshita et al. | 709/245 |
| 5,825,565 A | * | 10/1998 | Papenburg et al. | 359/883 |
| 5,825,865 A | * | 10/1998 | Oberlander et al. | 379/211.02 |
| 5,870,454 A | * | 2/1999 | Dahlen | 379/88.14 |
| 5,872,926 A | * | 2/1999 | Levac et al. | 709/206 |
| 5,912,952 A | * | 6/1999 | Brendzel | 379/93.25 |
| 6,072,862 A | * | 6/2000 | Srinivasan | 379/100.08 |
| 6,122,290 A | * | 9/2000 | Iawamata | 370/466 |
| 6,185,288 B1 | * | 2/2001 | Wong | 379/219 |

OTHER PUBLICATIONS

Workgroup Computing Report, vol. 19, No. 4, 1996, pp. 12–21.

* cited by examiner

Primary Examiner—Fan Tsang
Assistant Examiner—S. P. Singh
(74) Attorney, Agent, or Firm—Antonelli, Terry, Stout & Kraus, LLP

(57) ABSTRACT

When a sender sends a transmission message to a receiver by use of a communication appliance such as telephone, portable telephone, facsimile or electronic mail, the transmission massage is temporarily received by a computer-telephony integration (CTI) server. The CTI server makes reference to a user contact table to thereby specify a contact point of the receiver at present and the kind of a communication appliance capable of being used by the receiver which are registered in advance in the user contact table. Then, the CTI server sends the transmission message to the receiver after automatic media conversion in accordance with the communication appliance and reception condition which are allowed for the receiver to use. A reception condition requested by the sender may be reflected in a part of the reception condition of the receiver.

20 Claims, 20 Drawing Sheets

FIG. 2 SYSTEM CONFIGURATION OF CTI

FIG. 7
USER CONTACT INFORMATION TABLE

700

| 7011 | 7012 | 702 | 703 | 704 | 705 | 706 | 707 {7071, 7072} | | | 708 {7081, 7082, 7083} | | |
|---|---|---|---|---|---|---|---|---|---|---|---|---|
| | | | | | | | CONTACT-DISABLED RECORDING MEANS | | | CONTACT-ENABLED MEANS/ CONTACT POINT/CONDITION | | |
| USER NUMBER | NAME | OPENED MAIN TELEPHONE NUMBER | OPENED MAIN MAIL NUMBER | CONTACT ADJUSTMENT STATE | LOCATION/ WHERE-ABOUTS | CONTACT-ENABLED/ DISABLED | MEANS | CONTACT POINT | | MEANS | CONTACT POINT | CONDITION |
| 1 | A | AA11 | A-aaa | VALID | CUSTOMER | ENABLED | MESSAGE BOX | QQ11 | | PORTABLE TELEPHONE | AA22 | XXXXXX |
| 2 | B | BB11 | B-bbb | VALID | HOME | ENABLED | MESSAGE BOX | QQ22 | | FACSIMILE | BB22 | ZZZZZZ |
| 3 | C | CC11 | C-ccc | VALID | PLACE OF WORK | ENABLED | MAIL BOX | C-ccc | | MAIL | C-ccc | VVVVVV |
| ...... | ...... | ...... | ...... | ...... | ...... | ...... | ...... | ...... | | ...... | ...... | ...... |

FIG. 8

| 8011 | 805 | 8081 | 8082 | 8083 | | | | | | |
|---|---|---|---|---|---|---|---|---|---|---|
| | | | | 8083a | 8083b | 8083c | 8083d | 8083e | 8083f | 8083g |
| | | | | | | CONTACT-CONDITION | | | | |
| USER NUMBER | NAME | CONTACT-ENABLED MEANS | CONTACT POINT | PRIORITY | SENDING SOURCE MEANS | SENDING SOURCE TELEPHONE NUMBER/ADDRESS | DATE | CONTACT FORMAT | CONTACT CONTENT | OPTION |
| 1 | CUSTOMER | PORTABLE TELEPHONE | AA22 | ALL | ALL | ALL | ALL | IMMEDIATE | BEST EFFORT | NONE |
| | PLACE OF WORK | MAIL | A-aaa | ALL | ALL | ALL | ALL | DELAYED | ENTIRE INFORMATION | NONE |
| | HOME | FACSIMILE | AA33 | EXPRESS | ALL | ALL | ALL | DESIGNATED DELAYED | BEST EFFORT | NONE |
| | ... | ... | ... | ... | ... | ... | ... | ... | ... | ... |
| 2 | | | | | | | | | | |
| ... | | | | | | | | | | |

800
808

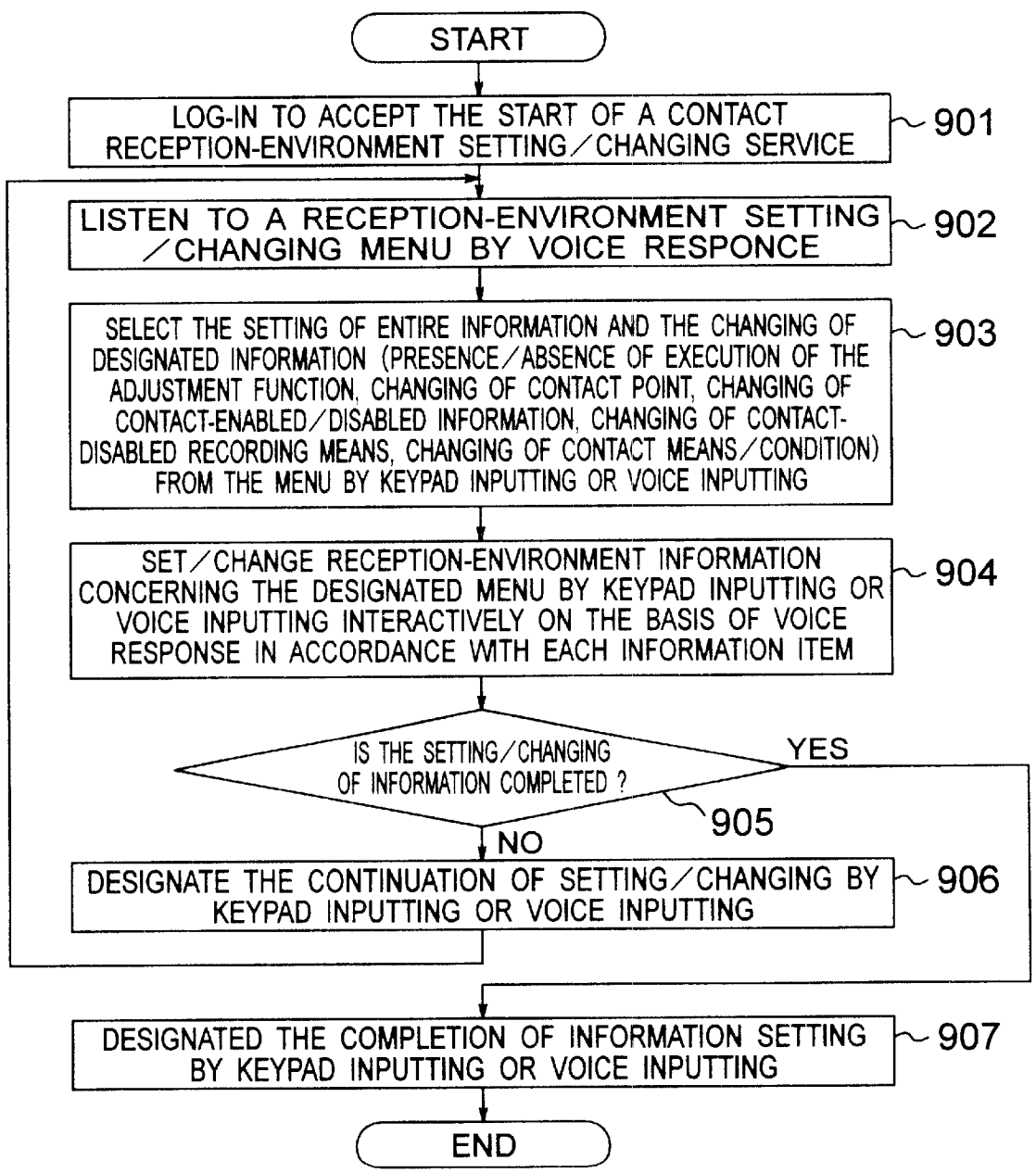

FIG. 11

LIMITATION OF TRANSFER CONTENT BASED ON DIFFERENCE IN SENDING/RECEIVING MEANS

| SENDING MEANS \ RECEIVING MEANS | | TELEPHONE/ PORTABLE TELEPHONE | MAIL | FACSIMILE | POCKET BELL |
|---|---|---|---|---|---|
| TELEPHONE/ PORTABLE TELEPHONE | | E | E | D | B |
| MAIL | TEXT MAIL | D | | D | B |
| | VOICE MAIL | E | E | D | B |
| | FACSIMILE MAIL | D | | E | B |
| FACSIMILE | | D | E | E | B |

LEVEL OF LIMITATION: ONLY INFORM (LEVEL A)
UP TO ITEM TILE/COMMENT (LEVEL B)
UP TO TEXT (LEVEL C)
UP TO BEST EFFORT (LEVEL D)
UP TO ENTIRE INFORMATION (LEVEL E)

FIG. 12

CORRESPONDENCE IN CLASSIFICATION OF MEDIA CONVERSION IN ACCORDANCE WITH DIFFERENCE IN SENDING/RECEIVING MEANS

| RECEIVING MEANS \ SENDING MEANS | TELEPHONE/ PORTABLE TELEPHONE | MAIL | | | FACSIMILE | POCKET BELL |
|---|---|---|---|---|---|---|
| | | TEXT MAIL | VOICE MAIL | FACSIMILE MAIL | | |
| TELEPHONE/ PORTABLE TELEPHONE | CONVERSION NOT REQUIRED | TEXT-TO-VOICE CONVERSION | CONVERSION NOT REQUIRED | IMAGE-TO-VOICE CONVERSION | IMAGE-TO-VOICE CONVERSION | |
| MAIL | VOICE MAIL | | CONVERSION NOT REQUIRED | | FACSIMILE MAIL | |
| FACSIMILE | VOICE-TO-IMAGE CONVERSION | TEXT-TO-IMAGE CONVERSION | VOICE-TO-IMAGE CONVERSION | CONVERSION NOT REQUIRED | CONVERSION NOT REQUIRED | |
| POCKET BELL | VOICE-TO-POCKET BELL CODE CONVERSION | TEXT-TO-POCKET BELL CODE CONVERSION | VOICE-TO-POCKET BELL CODE CONVERSION | IMAGE-TO-POCKET BELL CODE CONVERSION | IMAGE-TO-POCKET BELL CODE CONVERSION | |

FIG. 13

CORRESPONDENCE IN CLASSIFICATION OF PROCESSING
IN ACCORDANCE WITH RECEIVING MEANS AND CONTACT FORMAT

| CONTACT FORMAT / RECEIVING MEANS | IMMEDIATE | DELAYED | DESIGNATED TIME |
|---|---|---|---|
| TELEPHONE / PORTABLE TELEPHONE | TRANSFER DIRECTLY | NONE | TRANSFER AT A DESIGNATED TIME AFTER STORAGE IN A VOICE DATABASE |
| MAIL | NONE | TRANSFER DIRECTLY | TRANSFER AT A DESIGNATED TIME FROM A GROUPWARE SERVER |
| FACSIMILE | TRANSFER DIRECTLY | NONE | TRANSFER AT A DESIGNATED TIME AFTER STORAGE IN A FACSIMILE DATABASE |
| POCKET BELL | TRANSFER DIRECTLY | NONE | NONE |

FIG. 15
SYSTEM CONTACT INFORMATION TABLE

700B

| SYSTEM NUMBER (7011) | SYSTEM NAME (7012) | OPENED MAIN TELEPHONE NUMBER (702) | OPENED MAIN MAIL ADDRESS (703) | CONTACT ADJUSTMENT STATE (704) | LOCATION (705) | CONTACT-ENABLED/DISABLED (706) | CONTACT-DISABLED RECORDING MEANS (707) | | CONTACT-ENABLED MEANS/CONTACT POINT/CONDITION (708) | | |
|---|---|---|---|---|---|---|---|---|---|---|---|
| | | | | | | | MEANS (7071) | CONTACT POINT (7072) | MEANS (7081) | CONTACT POINT (7082) | CONDITION (7083) |
| 1 | ORDERING/STOCK MANAGEMENT SYSTEM | DD11 | D-ddd | VALID | BRANCH OFFICE D | ENABLED | MAIL BOX | PP11 | MAIL | D-ddd | xxxxxx |
| 2 | PURCHASE SYSTEM | EE11 | E-eee | VALID | BRANCH OFFICE E | ENABLED | FACSIMILE INFORMATION STORAGE | PP22 | FACSIMILE | EE22 | zzzzzz |
| 3 | EXAMINATION/APPROVAL WORKFLOW | FF11 | F-fff | VALID | BRANCH OFFICE F | ENABLED | MAIL BOX | F-fff | MAIL | F-fff | vvvvvv |
| ⋯ | ⋯ | ⋯ | ⋯ | ⋯ | ⋯ | ⋯ | ⋯ | ⋯ | ⋯ | ⋯ | ⋯ |

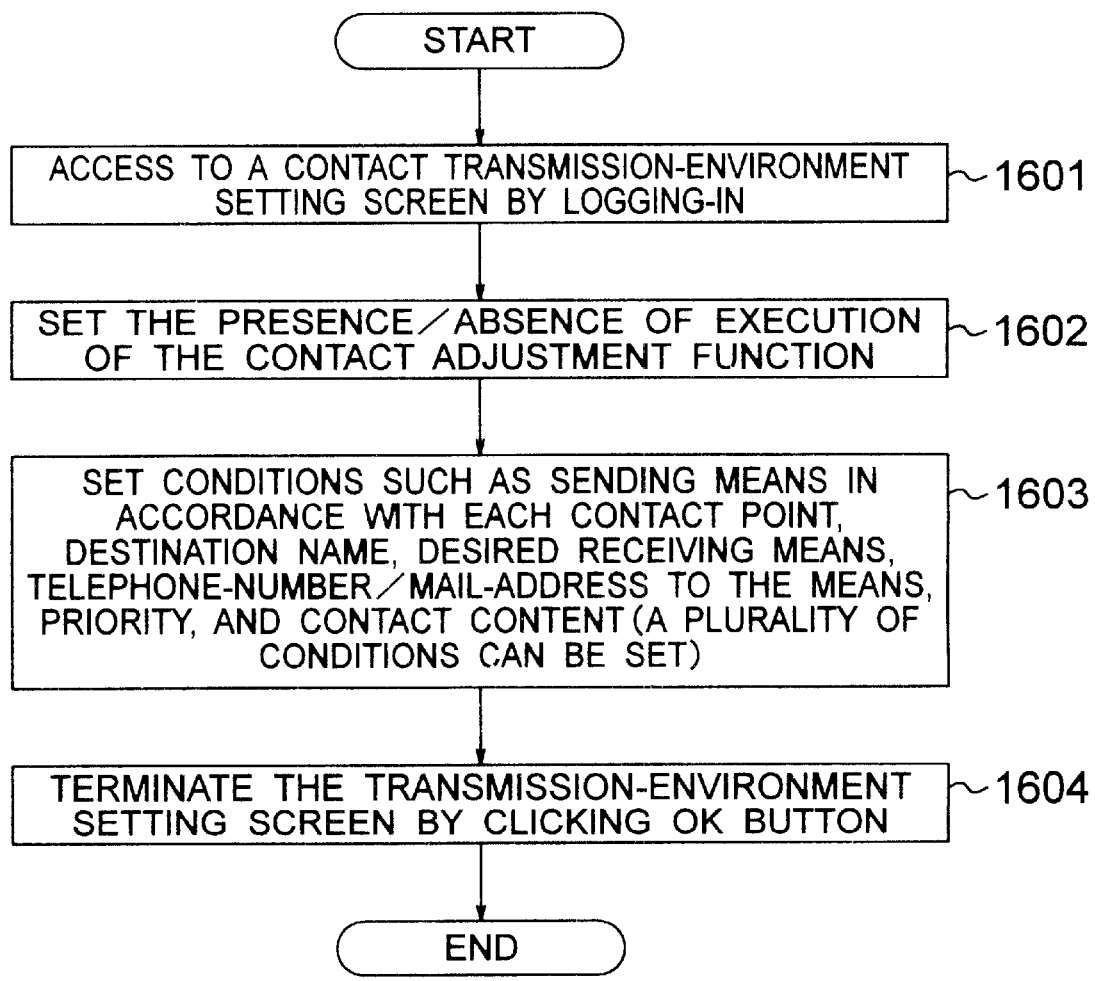

FIG. 18

USER CONTACT TRANSMISSION CONDITION INFORMATION TABLE 800

| USER NUMBER 8011 | CONTACT-ADJUST-MENT STATE 802 | SENDING MEANS 803 | DESTI-NATION NAME 804 | CONTACT REQUEST CONDITION 805 | | | |
|---|---|---|---|---|---|---|---|
| | | | | DESIRED RECEIVING MEANS 8051 | RECEIVING-SIDE TELEPHONE-NUMBER/ MAIL-ADDRESS 8052 | PRIORITY 8053 | CONTACT CONTENT 8054 |
| 1 | VALID | FACSIMILE | RECEIVER A | PORTABLE TELEPHONE | AA22 | EXPRESS | BEST EFFORT |
| | | TELEPHONE | RECEIVER B | MAIL | C-ccc | EXPRESS | ENTIRE INFORMATION |
| | | MAIL | RECEIVER C | FACSIMILE | BB22 | EXPRESS | BEST EFFORT |
| | | ... | ... | ... | ... | ... | ... |
| 2 | | | | | | | |
| ... | | | | | | | |

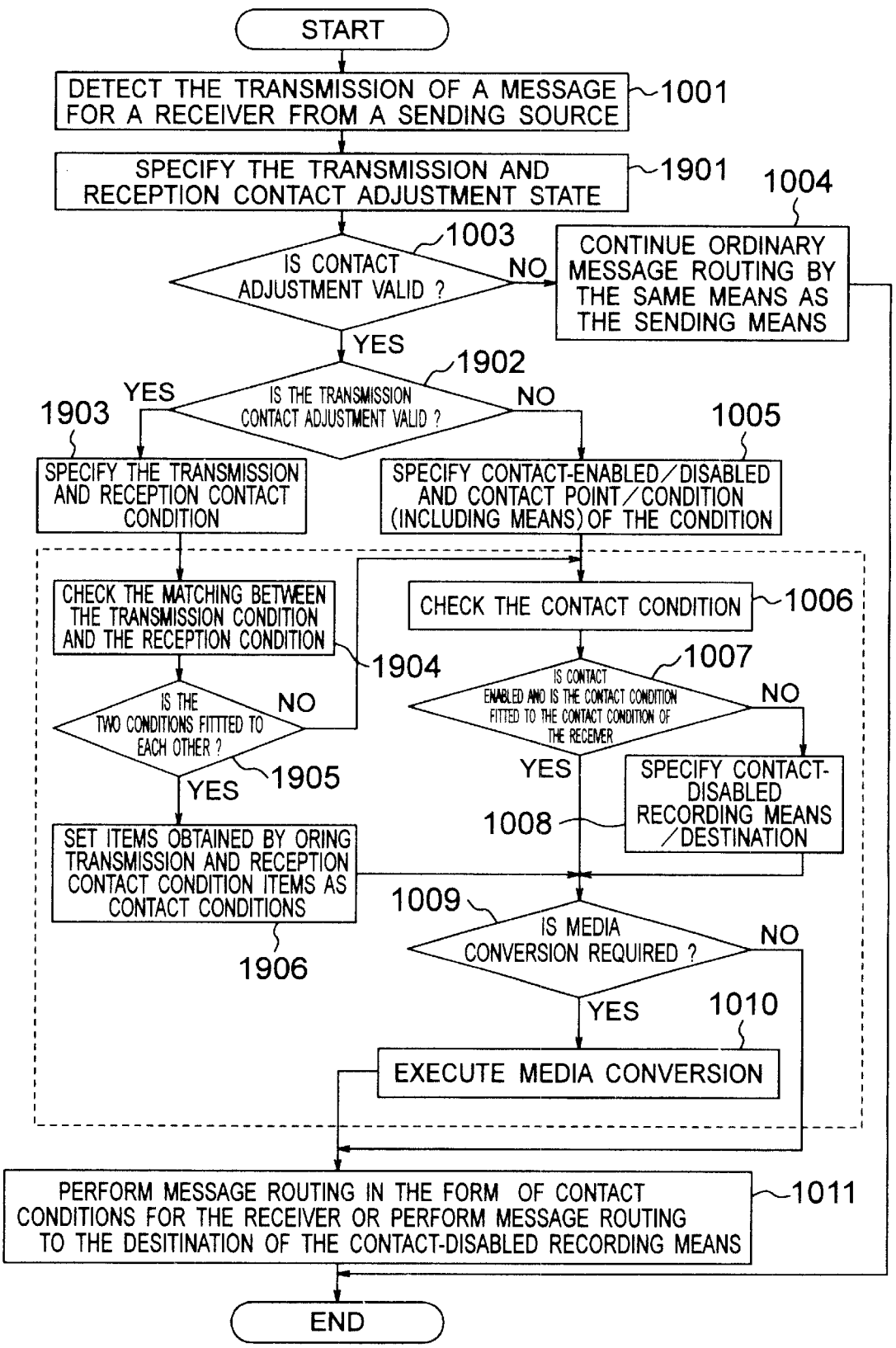

INFORMATION RECEPTION PROCESSING METHOD AND COMPUTER-TELEPHONY INTEGRATION SYSTEM

BACKGROUND OF THE INVENTION

The present invention relates to a computer-telephony integration system (hereinafter referred to as "CTI system") and an information reception processing method to provide an information processing environment for integrating communications with a computer, and particularly relates to a CTI system and an information reception processing method in which information (e.g. multimedia information with voice, text and image) sent from a transmitter side by an arbitrary information transmission means can be automatically converted and transmitted to a connection destination allowed to receive the information by a receiving-side subject in accordance with the reception environment in the connection destination.

In recent years, a CTI system for integrating a telephone with a computer has been demanded under an environment of call center, office, SOHO (Small Office Home Office), virtual enterprise, CALS (Commerce At Light Speed), or the like. Under the aforementioned environment, the CTI system uses multimedia information (e.g. voice, text and image) to construct an effective and efficient communication environment by using a multimodal communication means such as a telephone, a facsimile equipment or a personal computer or to construct an effective and efficient work aiding environment for associating a telephone system with a work system such as a groupware system or a business application by the multimodal communication means. For example, in call center work or office work, such a CTI system has been demanded for integrating computer processing with a conventional telephone system to aid work information with use of the telephone system or for associating one information system with another information system to aid integrated information of a system under an internet/intranet environment and the conventional telephone system to thereby attain improvement in work efficiency and customer's satisfaction.

Incidentally, as a conventional techniques of this type, there is a unified messaging technique in which communication means using various media such as voice, text and image information from various information appliances such as a telephone, facsimile equipment and a personal computer are unified in order to improve communication efficiency in office or SOHO. The technique is described in Workgroup Computer Report Vol. 19, No. 4, 1996, pp.12–17 and U.S. Pat. No. 5,524,137.

As another conventional technique, there is a telephony agent technique in which a person in charge of call center work in the past or a person having skill in call center work is automatically specified as a destination of telephone call by computer processing so that improvement in work efficiency and customer's satisfaction is attained by automatic acceptance/transfer and reduction of human load in a great deal of telephone calls occurring in call center work. The technique is described in Workgroup Computing Report Vol. 19, No. 4, 1966, pp.18–21.

However, the aforementioned conventional techniques merely control a destination of connection but do not control the manner of transmission of information in accordance with the reception environment on the destination of connection. There arises therefore a problem that user's transmission/reception of information can be performed only by a transmission/reception means designated on the system in advance and that a user is not allowed to select a contact means freely. As a result, the CTI technique and the unified messaging technique having association with groupware have not achieved any situation in which a user is allowed to have effective use of a communication environment that the user can use various connection means such as a telephone, facsimile equipment and a personal computer and various media such as voice, text and image.

SUMMARY OF THE INVENTION

An object of the present invention is to provide an information reception processing method and a computer-telephony integration system in which transmission control can be performed in accordance with the information reception environment of a receiving-side subject when multimedia communication information is transmitted from a sending-side subject to the receiving-side subject.

Another object of the present invention is to provide a recording medium on which programs and data to be used in the above-mentioned information reception processing method and computer-telephony integration system are recorded.

In order to achieve the above objects, according to an aspect of the present invention, there is provided an information reception processing method for transmitting information from an arbitrary information sending source to a specific receiving-side subject which is a destination of information transmission, the method comprising the steps of: preliminarily registering reception-environment information including, at least, contact-enabled-means information for indicating means allowed to receive information, contact-point information for designating a contact point of the means allowed to receive information, and reception-condition information for indicating a condition of information reception at the contact point, in accordance with an original destination in each of receiving-side subjects of information reception; and performing contact adjustment by referring to the reception-environment information when information destined for any one of the receiving-side subjects arrives to thereby acquire the contact-enabled-means information and contact-point information which can be received at the destined receiving-side subject, making judgment as to whether or not the arrived information satisfies a reception condition indicated by the reception-condition information of the receiving-side subject, and converting the arrived information so as to satisfy the reception condition when the reception condition is not satisfied and transmitting the converted information to the contact point.

According to another aspect of the present invention, there is provided a computer-telephony integration system for transmitting information from an arbitrary information sending source to a specific receiving-side subject which is a destination of information transmission, the system comprising: a reception-environment-information registration means for registering reception-environment information including, at least, contact-enabled-means information for indicating means allowed to receive information, contact-point information for designating a contact point of means allowed to receive information, and reception-condition information for indicating a condition of information reception at the contact point, in accordance with an original destination in each of receiving-side subjects of information reception; and contact adjustment means for performing contact adjustment by referring to the reception-environment information when information destined for any one of the receiving-side subjects arrives to thereby acquire the contact-enabled-means information and contact-point information which can be received at the destined receiving-side subject, making judgment as to whether or not the arrived information satisfies a reception condition indicated by the reception-condition information of the receiving-side subject, and converting the arrived information so as to satisfy the reception condition and transmitting the converted information to the contact point.

For example, the aforementioned reception-environment-information registration means may include storage means for storing reception-environment information, and means for accepting a reception-environment-information setting operation from the outside of the system.

Here, preferably, the aforementioned means for accepting a reception-environment-information setting operation has a function for displaying a reception-environment-information setting screen to carry out the reception-environment-information setting operation, a function for accepting an input in accordance with the screen, and a function for making the storage means store reception-environment setting data set by the accepted input.

Preferably, the function for displaying a reception-environment-information setting screen displays a screen on which at least contact-enabled-means information and contact-point information can be inputted.

Further, the system may further comprise transmission-environment-information registration means for setting a condition of a request for reception in the information sending side with respect to every original destination in each of the receiving-side subjects.

Here, the transmission-environment-information registration means may include a storage means for storing transmission-environment information, and means for accepting a transmission-environment-information setting operation from the outside of the system.

According to a further aspect of the present invention, there is provided a recording medium for recording a program to be executed by a computer to transmit information from an arbitrary information sending source to a specific receiving-side subject which is a destination of the information transmission, wherein the program is to be executed by the computer in a manner so that the computer performs processing of: preliminarily registering reception-environment information including, at least, contact-enabled-means information for indicating means allowed to receive information, contact-point information for designating a contact point of the means allowed to receive information, and reception-condition information for indicating a condition of information reception at the contact point, in accordance with an original destination in each of receiving-side subjects of information reception; and performing contact adjustment by referring to the reception-environment information when information destined for any one of the receiving-side subjects arrives to thereby acquire the contact-enabled-means information and contact-point information which can be received at the destined receiving-side subject, making judgment as to whether or not the arrived information satisfies a reception condition indicated by the reception-condition information of the receiving-side subject, and converting the arrived information so as to satisfy the reception condition when the reception condition is not satisfied and transmitting the converted information to the contact point.

For example, the reception-environment-information registration may contain a process for storing reception-environment information, and a process for accepting a reception-environment-information setting operation from the outside of the system.

The process for accepting a reception-environment-information setting operation may contain a process for displaying a reception-environment-information setting screen to carry out the reception-environment-information setting operation, a process for accepting an input in accordance with the screen, and a process for making the storage means store reception-environment setting data set by the accepted input.

The process for displaying a reception-environment-information setting screen may display a screen on which at least contact-enabled-means information and contact-point information can be inputted.

The function for displaying a reception-environment-information setting screen displays a screen on which information for indicating whether the information can be received on the receiving side or not, and information for indicating a storage means for recording the sent information when reception is disabled, can be further inputted.

The program may further contain a communication means for performing data communication with an information processing apparatus in the outside of the system, and the process for accepting a reception-environment-information setting operation may contain a process for transmitting programs and data to a requester through the communication means to carry out the process for displaying a reception-environment-information setting screen and carry out the function for accepting an input in accordance with the screen when a reception-environment-information setting request is accepted from the outside of the system, and a process for receiving reception-environment setting data sent from the requester through the communication means and delivering the data to the function for making the storage means store information.

According to a still further aspect of the resent invention, there is provided a recording medium for recording a program to be executed by a computer for transmitting information from an arbitrary information sending source to a specific receiving-side subject which is a destination of information transmission, wherein the program contains: a program for specifying a sender of telephone or facsimile and sender information and controlling automatic call distribution; a program for controlling interactive voice response (IVR); a groupware program for achieving communication using voice, text and image information between apparatuses connected to a network; a contact manager program for registering and managing reception-environment-condition information containing, at least, contact-enabled-means information, contact-point information and reception-condition information with respect to a reception subject; and a telephony agent program for making reference to the reception-environment information at the time of arrival of information destined for a receiving-side subject to thereby acquire contact-enabled-means information and contact-point information in the receiving-side subject in the destination, judging whether the arrived information satisfies a reception condition indicated by the reception-condition information in the receiving-side subject, and converting the arrived information to satisfy the reception condition when the arrived information does not satisfy the condition.

As a more specific mode of the aforementioned computer-telephony integration system according to the present invention, the following means may be used in combination.

Means (ANI: Automatic Number Identification/DNIS: Dialed Number Identification Service) for specifying sender and receiver information of telephone or facsimile, means (ACD: Automatic Call Distribution) for distributing call of telephone or facsimile automatically, means (IVR: Interactive Voice Response) for performing automatic response by automatically recognizing voice information, for example, from telephone and converting the voice information into text information or converting text information into voice information for telephone, means for converting image information, for example, from facsimile into image information or converting text information into image information for facsimile, means for sending/receiving text-format electronic mail as a message, means for unified messaging for multimedia electronic mail, desirably, such as voice mail, facsimile mail and text mail, means for registering/managing location/contact-point information for another system newly and additionally associated with the means for registering/managing location/contact-point information for a user's system, means for registering and holding a receiver contact condition containing at least two requisites among the requisites consisting of propriety of contact, contact-enabled means, priority, connection format, used language, contact content, and transfer route only on the receiving side or independently both on the sending side and on the receiving side or selectively from the receiving side condition on the sending side, and a telephony agent means for routing information by specifying a contact point at which a user can receive the information at the time of reception of telephone, facsimile or electronic mail destined for the user, and performing media conversion and condition adjustment automatically on the basis of a contact condition in which the user can receive the information.

BRIEF DESCRIPTION OF THE DRAWINGS

FIG. 7 is an explanatory view showing an example of a user contact information table;

FIG. 8 is an explanatory view showing an example of a user location contact condition information table on which contact conditions in each user are classified by location;

FIG. 9 is a flow chart showing the operation of setting/changing the contact reception environment from the telephone/facsimile side;

FIG. 11 is an explanatory view showing limitation in the content of contact on the basis of a difference in transmission/reception means;

FIG. 12 is an explanatory view showing correspondence in classification of media conversion on the basis of a difference in transmission/reception means;

FIG. 13 is an explanatory view showing correspondence in classification of processing on the basis of reception means and contact format;

FIG. 15 is an explanatory view showing a system contact information table;

FIG. 16 is a flow chart showing the operation of setting/changing the contact transmission environment from the PC client side;

FIG. 18 is an explanatory view showing a user contact transmission condition information table on which contact transmission conditions are classified by user;

FIG. 19 is a flow chart showing the operation of routing a message in the case where the transmission condition selection is designated.

DESCRIPTION OF THE PREFERRED EMBODIMENTS

Embodiments of the present invention will be described below with reference to the drawings.

Figure 1:
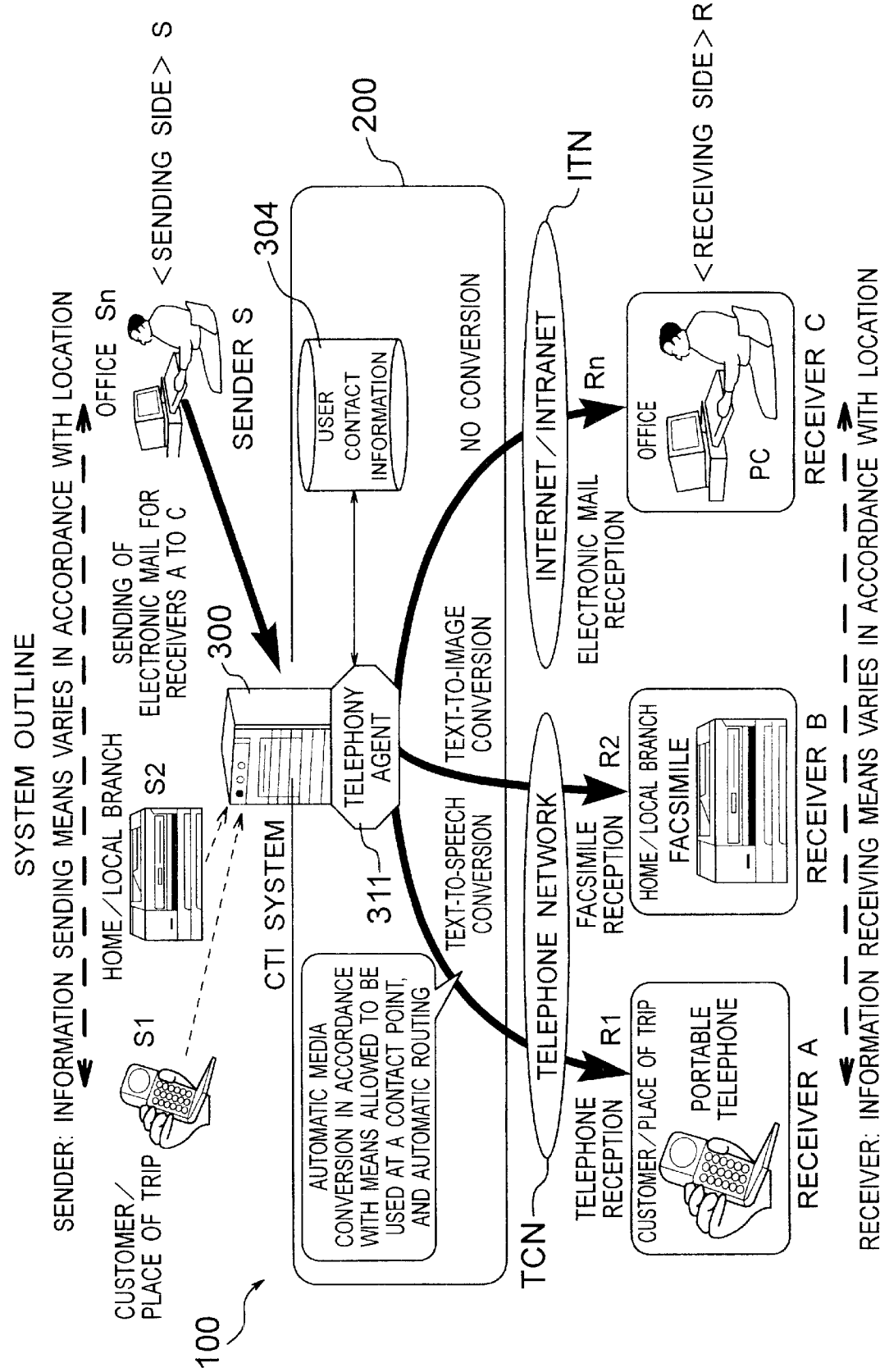
FIG. 1 is an explanatory view showing the outline of a system to indicate the schematic characteristic of the present invention.
Figure 2:
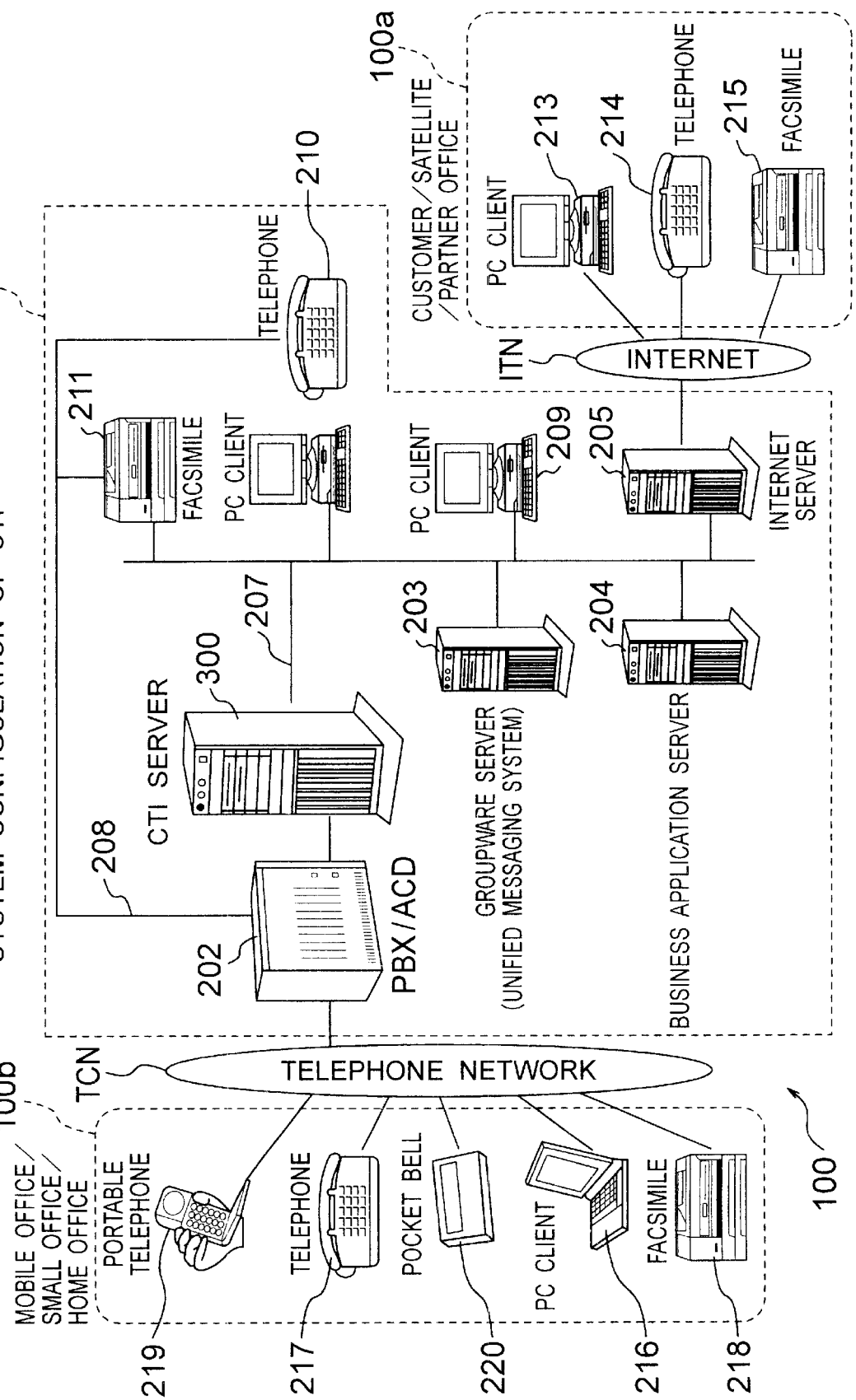
FIG. 2 is an explanatory view showing an example of the schematic system configuration of a CTI system according to the present invention.
Figure 3:
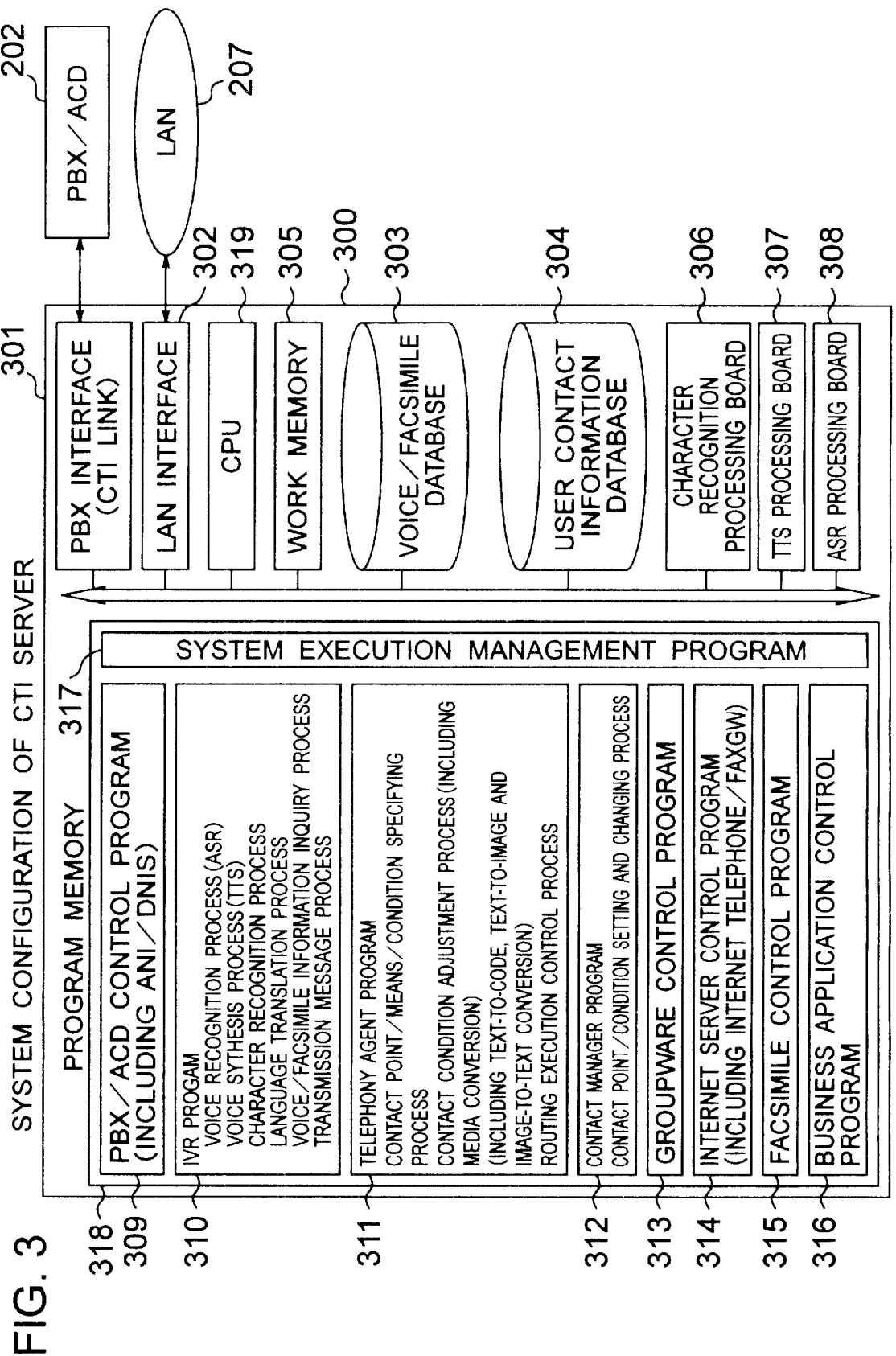
FIG. 3 is a block diagram showing an example of the system configuration of a CTI server system according to the present invention.

Referring now to FIGS. 1 through 3, an embodiment of the present invention will be described.

The schematic characteristic of a CTI system 100 according to the present invention is shown in FIG. 1. The CTI system 100 uses various communication means such as a telephone, a facsimile equipment and a personal computer (PC) to give a user a communication environment in which multimedia information such as voice, text and image is allowed to be exchanged and in which information transmission is hardly limited regardless of difference in information transmission/reception means and regardless of difference in information expression format between the information transmission side and the information reception side. Hence, this CTI system 100 is provided between a subject of information sending side (hereinafter sometimes simply referred to as "sending side") S and a subject of information receiving side (hereinafter simply referred to as "receiving side") R as shown in FIG. 1.

This CTI system 100 routes information from the sending side S to the receiving side R, that is, sets a path for information transmission so that a contact means, for example, Rn, allowed to be used is selected from contact means R1, R2, . . . Rn which are means for information reception on the receiving side R. When the expression format of information on the sending side S is different from the expression format of information on the receiving side R, this CTI system 100 further converts the expression format automatically so that information on the sending side S can be used by the receiving side R. This is for the purpose of eliminating limitation that information cannot be received because there is generally difference in the expression format of information between media when the medium used on the sending side S and the medium used on the receiving side R are different from each other. When there is a difference between media corresponding to the two sides, such as a telephone and a facsimile equipment, a telephone and a personal computer, or a facsimile equipment and a personal computer, there is a difference between the expression formats of information used in the corresponding two media, such as voice and image, voice and text, or image and text. When the expression format of information used in one medium is different from the expression format of information used in the other medium as described above, the expression format in one medium is required to be converted into the expression format in the other medium.

For convenience of description, conversion of the expression format of information between different media may be called not only "information expression format conversion" but also "media conversion" in this specification. In this embodiment, media conversion or expression format conversion mainly means the conversion of the expression format of information between different kinds of media. The present invention is, however, not limited thereto. For example, media conversion or expression format conversion may contain the conversion of the expression format of information between media of the same kind. For example, media conversion may contain the conversion of the expression format of information when word processing software programs of different kinds or word processing software of the same kind but different versions are used so that information cannot be transmitted or cannot be read because of difference in the expression format in spite of information transmission media of the same kind.

To perform the aforementioned routing and media conversion and perform registration therefor, this CTI system 100 has a CTI server 300 having a telephony agent program 311, and a contact manager program 312 (see FIG. 3). Further, the CTI server 300 includes a user contact information database 304 used in routing and media conversion as will be described later.

FIG. 2 is a configuration diagram of an embodiment in which the CTI system 100 according to the present invention is applied to an office 200. In the embodiment shown in FIG. 2, the CTI server 300 is connected to various information processing apparatuses in the office 200 through a local area network (LAN) 207 and connected to a telephone switchboard (PBX/ACD) 202 for perform communication with the outside. Further, the CTI server 300 can be connected to external apparatuses through internet ITN. Incidentally, in the embodiment shown in FIG. 2, the CTI server 300 is connected to internet ITN through an internet server 205 which will be described later. Configuration may be made so that the CTI server 300 can be connected directly to internet ITN.

The telephone switchboard (PBX/ACD) 202 is an automatic call distribution telephone switchboard having a function for performing switching control of in-bound call from a telephone network TCN to the CTI server 300 and outbound call from the CTI server 300 to the telephone network TCN and an automatic call distribution function for distributing call automatically. A telephone 210 and a facsimile equipment 211 as other apparatuses in the office than the CTI server 300 are connected to the telephone switchboard 202 through telephone line 208.

In the office 200 shown in FIG. 2, a groupware server 203 for providing a unified messaging service for unified messaging of voice, text and facsimile mail and a workflow management service of a work process, a business application server 204 for providing a basic work processing service and an internet server 205 for providing an internet service such as WWW, internet telephone and facsimile are provided as other apparatuses connected to the LAN 207 than the CTI server 300. The CTI server 300 provides an information processing service using combination of telephone processing and computer processing in association with the server group and the PBX/ACD.

Further, PC clients 209 are provided in the office 200. The PC clients 209 are connected to the server group through the LAN 207 and connected to the PBX/ACD 202 through the telephone line 208 to thereby provide means in which a user in the office sends/receives information.

On the other hand, in the outside of the office 200, respective development of external offices 100a and 100b which are virtual offices such as a customer office, a satellite office, a business partner office, a mobile office (outdoor), a small office (small-scale branch office, store or business office) and a home office (indoor), is assumed. Apparatuses which can be used by a user in the external office 100a are, for example, a PC client 213, a telephone 214 and a facsimile equipment 215 as apparatuses which can serve as means for sending/receiving information through internet ITN. Further, apparatuses which can serve as means in which a user in the external office 100b transmits/receives information through the telephone network TCN are, for example, a PC client 216, a telephone 217, a facsimile equipment 218, a portable telephone 219 and a pocket bell 220. Incidentally, classification into the external offices 100a and 100b is for the sake of convenience and not limited thereto. Further, apparatuses which can be used in the respective external offices 100a and 100b are shown by way of example.

As described above, in the CTI system 100 according to the present invention, not only telephone but also various information transmission means such as internet and LAN are combined with a computer so that information from an arbitrary transmission means can be transmitted to an arbitrary receiving means.

FIG. 3 is a system configuration diagram of the CTI server 300 according to the present invention. The CTI server 300 has a PBX interface 301 for connection to the PBX 202, a LAN interface 302 for connection to the LAN 207 in the office, a voice/facsimile database 303 for storing voice or facsimile information, a user contact information database 304 for storing system user location/contact-point information and contact means and contact condition information, a work memory 305 for temporarily storing necessary information retrieved from the database 304 and serving as a work area for respective program processing, a program memory 318 for storing various programs, and a CPU 319 for performing access control to memory, database and board and executing respective programs.

Further, the CTI server 300 has various boards on which exclusive-use information processing apparatuses are mounted for performing specific processing, for example, actual processing for media conversion. That is, the CTI server 300 has a character recognition processing board 306 for executing character recognition processing at a high speed, a TTS (Text To Speech) processing board 307 for executing voice synthesis processing at a high speed by converting text information into voice information and an ASR processing board 308 for executing ASR (Automatic Speech Recognition) processing at a high speed for converting voice information into text information by voice recognition. These boards 306, 307 and 308 execute various kinds of processing concerning voice and character recognition processing under the control of an IVR (interactive voice response) program 310 which will be described later. Incidentally, boards which can be attached to the CTI server 300 according to the present invention are not limited to these boards.

When the load on the CPU 319 is small, configuration may be made so that all or part of the functions to be carried out by these exclusive-use processing boards can be executed by the CPU 319. In this case, a program therefor is added to the program memory 318.

For example, programs stored in the aforementioned program memory 318 are, for example, a PBX/ACD control program 309 containing a sender and receiver information service (ANI/DNIS) of telephone and facsimile for controlling PBX/ACD, an IVR program 310 for voice recognition, voice synthesis, character recognition, language translation, voice and facsimile information collation and massaging, a telephony agent program 311 for routing information by specifying a contact point, a contact means and a contact condition on the receiving side and adjusting the contact condition to convert the expression format of information into an expression format according to the contact means on the receiving side, a contact manager program 312 for setting, changing and collating user contact information, a groupware control program 313 for performing control in association with the groupware server 203 through the LAN 207, an internet server control program 314 containing an internet telephone and facsimile gateway function for performing control in association with the internet server 205, a facsimile control program 315 for controlling facsimile in the office, a business application control program 316 for performing control in association with the business application server 204, and a system execution management program 317 for managing execution of the program group. Incidentally, programs installed in the CTI server 300 according to the present invention are not limited to these programs.

These programs are executed by the CPU 319, by which various functions defined by the programs are achieved. Accordingly, processing is not achieved by the programs per se. In this specification, however, expression concerning the operation of the CPU 319 may be omitted for convenience of description as if various kinds of processing are achieved by the programs per se.

All or part of the aforementioned programs are recorded in a recording medium such as a CD-ROM so that they can be provided to the CTI system 100. Further, all or part of the programs are stored, for example, in a hard disk device not shown. Further, the data structure of data used in the programs, that is, the data structure of data, for example, generated or used in the contact manager program 312 and the telephony agent program 311 may be recorded in the aforementioned recording medium so as to be provided to the CTI system. For example, this type data structure is shown typically in FIGS. 7, 8, 15 and 18 or FIGS. 11, 12 and 13.

As described above, the telephony agent program 311 performs processing for routing information by specifying a contact point, a contact means and a contact condition on the receiving side and adjusting the contact condition to convert the expression format of information into an expression format according to the contact means on the receiving side. Accordingly, the telephony agent program 311 is executed by the CPU 319 to thereby achieve means for acquiring reception-enabled contact-point information in a receiving-side subject by referring the reception-environment information at the time of arrival of information for the receiving-side subject, means for converting the arrived information to satisfy the reception condition indicated by the reception-condition information in the receiving-side subject when the arrived information does not satisfy the reception condition, and means for transmitting the converted information to the contact point on the basis of the acquired contact-point information. In specific functioning of these means, other hardware and software resources operate associatively. For example, for execution of media conversion, the aforementioned programs and boards 306, 307 and/or 308 may operate cooperatively. Further, in registration of the reception-environment information, the contact manager program 312, hardware and software resources for communication and an input device operate.

For example, each of the voice/facsimile database 303 and the user contact information database 304 is constituted by a storage device such as a hard disk device. These databases 303 and 304 may be constituted by one and the same storage device.

The database 304 is used as a reception-environment-information registration means for registering reception-environment information containing, at least, contact-point information for indicating a contact point enabled to receive information in each receiving-side subject of information transmission, and reception-condition information for indicating how the contact point receives information. As a specific example, a user contact information table 700A shown in FIG. 7 and a user contact condition information table 800 shown in FIG. 8 are stored.

The user contact information table 700A shown in FIG. 7 contains, at least, contact-point information with respect to each user as a subject of reception. That is, user number 7011 and user name 7012 as a user identifier, opened main telephone number 702 as the number of an opened main telephone, opened main mail address 703, contact adjustment state information 704 for indicating whether adjustment for transmission of information to the receiving side is effective or not, location/whereabouts information 705 for indicating location or whereabouts of each user, contact-enabled/disabled information 706 for indicating whether contact is enabled or not, contact-disabled recording means information 707 for indicating means for recording information to be received when information reception is impossible, and contact format information 708 for indicating the format of contact when contact is enabled, are stored in the user contact information table 700A. Recording means information 7071 for indicating recording means when contact is disabled, and contact-point information 7072 for indicating a contact point of the recording means, are stored in the contact-disabled recording means information 707. Contact means information 7081 for indicating contact-enabled means, contact-point information 7082 for indicating a contact point of the contact-enabled means, and contact condition information 7083 for indicating the condition of contact, are stored in the contact format information 708.

The user location contact condition information table 800 shown in FIG. 8 is a table which defines contact format information classified by location of each user. In this table, contact formats with respect to at least one location can be defined. The contact formats can be registered in advance as will be described later, so that a contact condition registered in advance can be set in the user contact information table 700A shown in FIG. 7 by a simple operation of designating location or whereabouts.

Although FIG. 7 shows the case where the contents registered in the user location contact condition information table 800 shown in FIG. 8 are transferred to the user contact information table 700A, the present invention is not limited thereto. For example, a pointer for linking to a record of a location or contact point on the user location contact condition information table 800 shown in FIG. 8 may be stored in the contact format information 708 on the table 700A shown in FIG. 7 so that information per se is not transferred. Alternatively, for example, information stored in the location/whereabouts information 705 shown in FIG. 7 may be used as the aforementioned pointer. In this case, the column of contact format information 708 can be eliminated from the table 700A shown in FIG. 7.

User number 801, location/whereabouts information 805 and contact format information 808 are registered in the user location contact condition information table 800 shown in FIG. 8. The location/whereabouts information 805 can be provided correspondingly to location or whereabouts. The contact format information 808 can be recorded correspondingly to the location/whereabouts information 805. Various contact formats can be set in the contact format information 808 in accordance with the environment of each location or whereabouts.

As described above with respect to the table 700A shown in FIG. 7, contact means information 8081 for indicating contact-enabled means, contact-point information 8082 for indicating a contact point of each contact-enabled means and contact condition information 8083 for indicating the condition of contact are stored as the contact format information.

The contact condition information 8083 contains: priority information 8083a for indicating priority in processing of a transmission message, for example, distinction between express mail and ordinary mail; sender means information 8083b for indicating information sending means on the sending side S; sender telephone number/address information 8083c for indicating the telephone number and/or mail address of the sender; date information 8083d for setting the date of reception of the transmission message; contact format information 8083e for indicating a timelike contact format in transfer of the transmission message, such as for example "immediate", "delayed" or "delayed for a designated time"; contact-content information 8083f for indicating the content of contact showing the degree of the content of information to be contacted (transferred), such as for example "only inform", "only item title or comment", "only text", "entire information" or "best effort"; and option setting information 8083g for setting various options, such as for example "translation effectuation" and "cost-minimized routing effectuation". The "ALL" set on the table of FIG. 8 shows that any condition allowed to be set in the item can be applied. In the example of FIG. 8, option setting information is designated as "None" showing the state in which no option is set.

An example of the operation of the CTI system according to the present invention will be described below with reference to FIGS. 1 through 13. Classifying roughly, the CTI system performs a process of setting or changing contact reception-environment information as a preparatory process and a contact state adjustment process at the time of reception of information. Incidentally, the former process can be carried out by various media such as for example a PC client, a telephone and a facsimile equipment.

Figure 4:
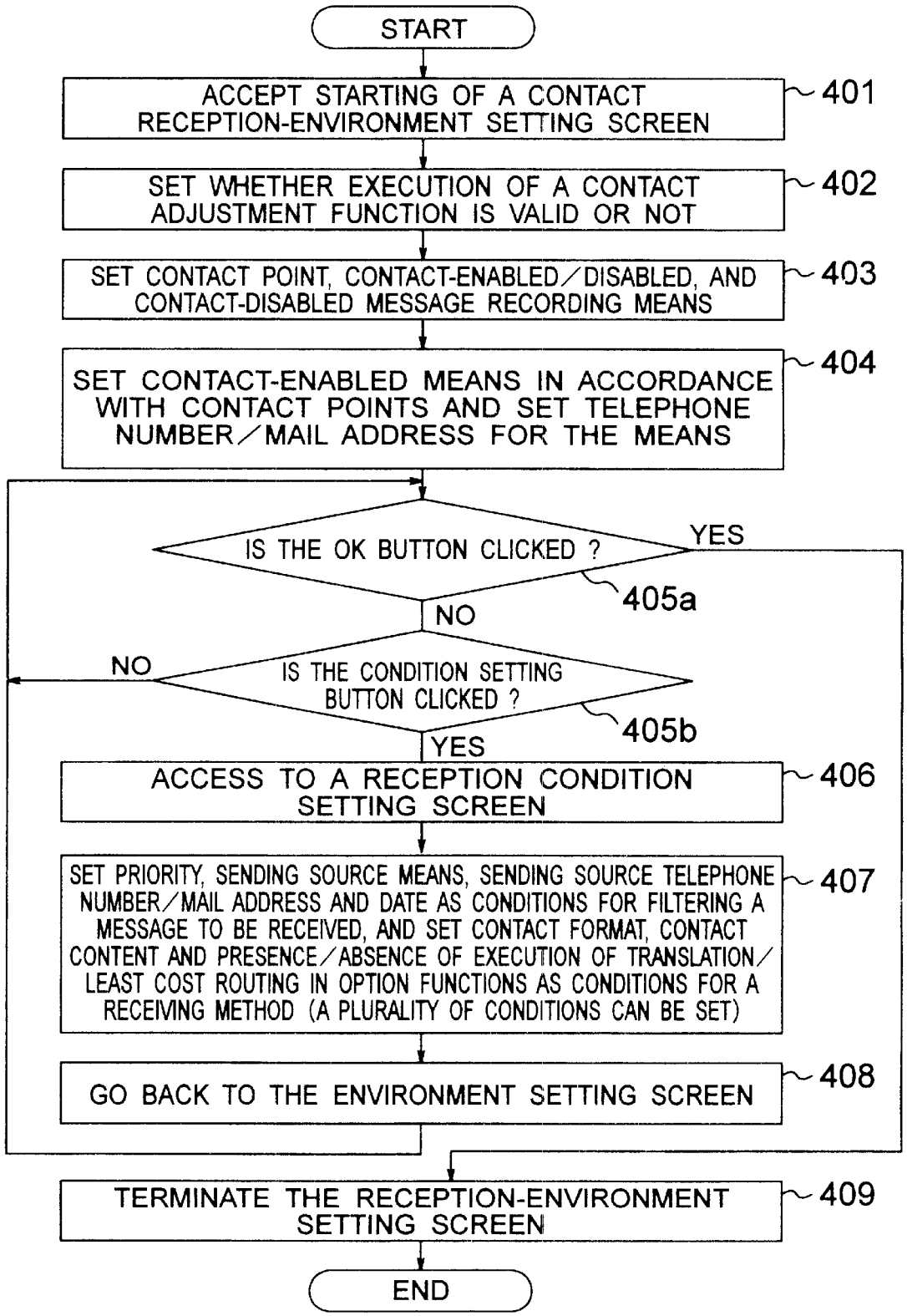
FIG. 4 is a flow chart showing the operation of setting/changing the contact reception environment from the PC client side.

FIG. 4 is an operational flow chart of the process of setting or changing contact reception-environment information of a PC client by accepting an operation from the PC client preparatorily so that the CTI system according to the present invention executes message routing, that is, information transmission. The process is executed on the basis of the associative operation of the PC client and the internet server 205 and CTI server 300 in the system according to the present invention. In the CTI server 300, the CPU 319 executes the contact manager program 312 to thereby carry out the process. That is, each program is executed by the CPU 319, so that various functions defined by the program operate to execute the process. Hereinafter, such programs per se will be described as a subject of achievement of various processes for convenience of description.

For this process, the contact manager program 312 contains a program and data which are prepared in advance for achieving contact reception-environment setting GUI in the PC client. The program and data are sent to the PC client by the contact manager program 312 in accordance with a request from the PC client. Further, the contact manager program 312 carries out a process for setting the condition of reception as will be described later. The contact manager program 312 contains a program and data which are prepared in advance for achieving GUI therefor.

Figure 5:
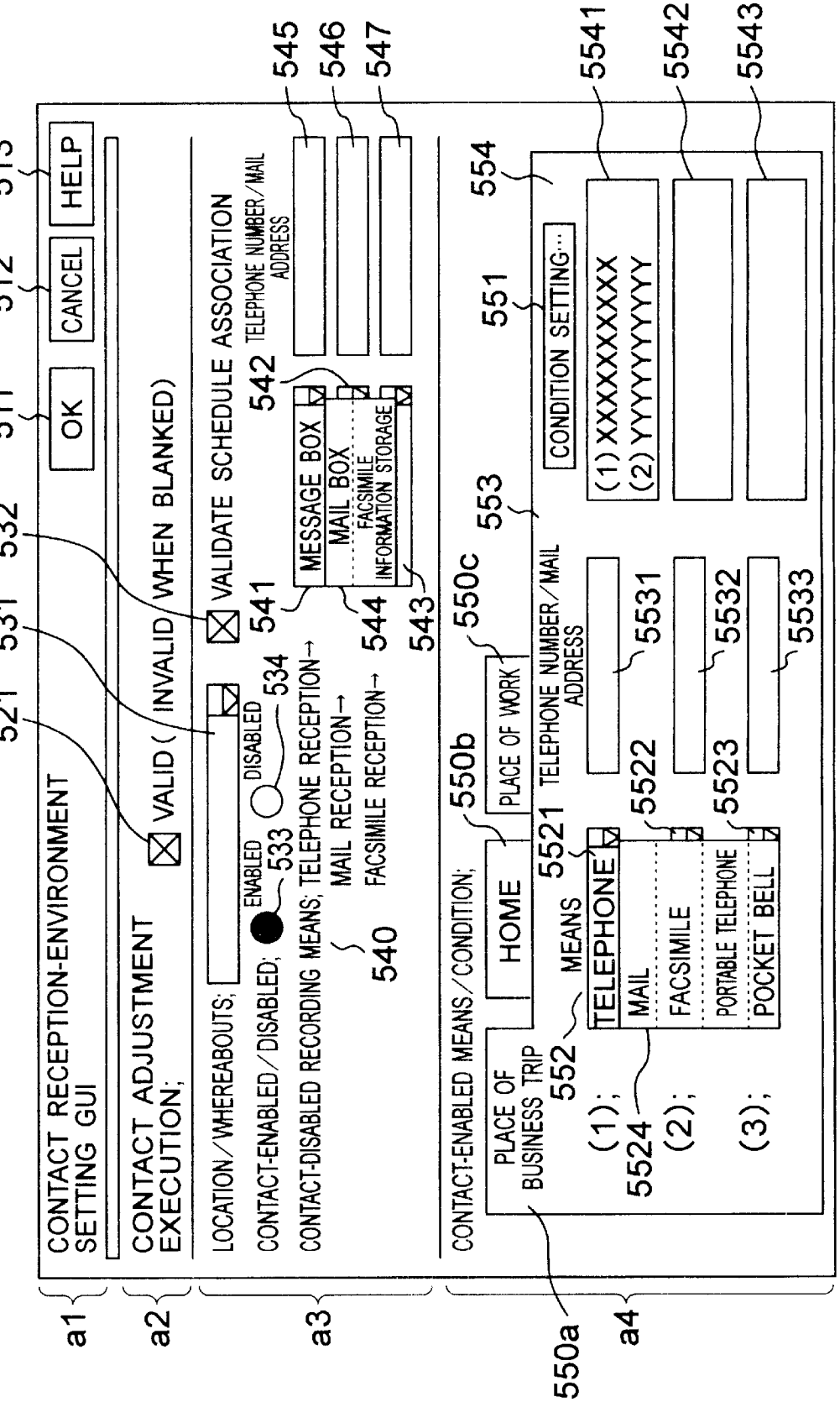
FIG. 5 is an explanatory view showing an example of a scene for the operation of setting/changing the contact reception environment from the PC client side.

As such contact reception-environment setting GUI, for example, the shown in FIG. 5 is prepared. The content of the user contact information table 700A shown in FIG. 7 is set by this contact reception-environment setting GUI. Incidentally, the contact format information 708 shown in FIG. 8 is set by the reception condition setting GUI shown in FIG. 6 as will be described later.

Classifying roughly, the GUI shown in FIG. 5 has four areas. This is, an area a1 for indicating the contact reception-environment setting, an area a2 for setting the validity of contact adjustment execution, an area a3 for setting location, contact-enabling/disabling in the location and recording in the contact-disabled state, and an area a4 for setting the contact-enabled condition, are displayed on a setting screen. Regions called "buttons" for performing operations and settings and character/symbol input regions for inputting characters, symbols or codes are arranged in these areas. A function of inputting an instruction concerning an operation defined by each of the button regions is fulfilled when the position of the button region is clicked, for example, by a mouse.

The GUI used in this embodiment is not limited to the example shown in FIG. 5. For example, various kinds of GUI having button regions, character/symbol input regions, etc. can be used and these regions function in the same manner as shown in FIG. 5.

An OK button 511 for instructing the confirmation of the contact reception environment which has been already set, a CANCEL button 512 for instructing the cancellation of the setting and a HELP button 513 for accepting a request to display a guide message for the operation are arranged in the area a1.

A validity instruction input portion 521 for setting whether contact adjustment according to the present invention is to be executed or not, is provided in the area a2. That is, the adjustment is validated when the validity instruction input portion 521 is marked with the symbol "X", and the adjustment is invalidated, that is, an instruction to invalidate the adjustment according to the present invention can be inputted when the validity instruction input portion 521 is blanked. In practice, the validity can be set not by the operation of marking the position with the symbol "X" but by the operation of clicking the position. As a result of the operation, the symbol "X" is displayed and the acceptance of the instruction is displayed. This rule concerning the operation and display is not limited to this but applies to other GUI which will be described layer.

A location/whereabouts input portion 531, a schedule association validity instruction input portion 532 for inputting whether schedule association is validated or not, enabled/disabled input portions 533 and 534 for inputting contact-enabled/disabled information, and a contact-disabled recording means input portion 540 for inputting recording means when contact is disabled or when the contact condition is not satisfied, are provided in the area a3.

In the location/whereabouts input portion 531, the location of a user on the receiving side can be inputted by character. Though not shown in FIG. 5, locations or whereabouts inputted in the past may be stored so that suitable one can be selected from the stored locations. Alternatively, standard locations or whereabouts may be prepared so that suitable one can be selected from the locations.

When the schedule association validity instruction input portion 532 is marked with the symbol "X", the location or whereabouts is acquired automatically with reference to the schedule information of the user so that the acquired location or whereabouts can be reflected as the location or whereabouts information. When the schedule association validity instruction input portion 532 is blanked, linking to the schedule information can be invalidated. In this case, the input of the designated location or whereabouts is validated. Incidentally, the user schedule information used is managed by the contact manager program 312.

A contact-enabled setting portion 533 and a contact-disabled setting portion 534 are provided in the enabled/disabled input portions 533 and 534. Here, either instruction is validated. Incidentally, when either portion is clicked, the display format is changed so that the acceptance of the instruction is indicated. For example, the acceptance of the instruction is indicated by the dot expression as shown in FIG. 5. Incidentally, the acceptance format of this operation and the display format of the acceptance result apply to other GUI which will be described later.

Input portions 541 to 543 for designating recording means in accordance with telephone reception, mail reception and facsimile reception respectively and input portions 545 to 547 for inputting telephone number, mail address, etc. in accordance with telephone reception, mail reception and facsimile reception respectively are provided in the contact-disabled recording means input portion 540. Designation can be made by inputting characters or symbols directly through a keyboard into any of these input portions or a pull-down menu 544 may be provided so that recording means prepared in advance or designating means inputted in the past are displayed for selection. In FIG. 5, the pull-down menu 544 is opened for inputting in the input portion 541.

Three input regions 550 concerning "place of business trip" 550a, "home" 550b and "place of work" 550c are prepared as windows in the area a4. These input regions are prepared normally in the system because these are typical locations or whereabouts. It is a matter of course that these input regions need not be prepared in advance and may be prepared whenever necessary. By clicking a headline portion in each input region, the region subjected to clicking is displayed in front and inputting is enabled. FIG. 5 shows the case where the "place of business trip" 550a is selected and inputting is enabled. Incidentally, the CTI system according to the present invention is not limited thereto. For example, windows may be prepared so that the locations or whereabouts inputted in the location/whereabouts input portion 531 in the area a3 are used as headlines of the windows. Further, when the schedule association is validated, windows may be prepared so that the locations or whereabouts registered in the schedule managed by the contact manager are used as headlines of the windows.

A contact means input portion 552 (5521 to 5523) for setting contact means in accordance with respective locations, a contact point input portion 553 (5531 to 5533) for setting contact points in accordance with respective locations, a condition setting start portion 551 as a region for starting a screen for setting a condition, and a set condition display portion 554 for displaying set conditions, are provided in the area a4. In the example shown in FIG. 5, the contact means input portion 552 has three input regions 5521 to 5523, the contact point input portion 553 has three input regions 5531 to 5533, and the set condition display portion 554 has three input regions 5541 to 5543. Of course, this is only an example and the number of input regions is not limited thereto.

In the contact means input portion 552, a pull-down menu 5524 can be displayed so that, when a target contact means such as telephone is designated, inputting is enabled. FIG. 5 shows a state in which a pull-down menu in the contact means input region 5521 is opened. Such a pull-down menu is provided in each of the contact means input regions 5521 to 5523. Though not shown, the contact point input portion 553 can be configured in the same manner as the contact means input portion 552. Of course, a specific contact means and a specific contact point can be inputted directly in the contact means input portion 552 and the contact point input portion 553.

Incidentally, when this CTI system is installed, for example, in a specific enterprise, contact means and contact points given to a user in the enterprise with respect to the "place of work" 550c may be registered in advance as standard values of this system.

Figure 6:
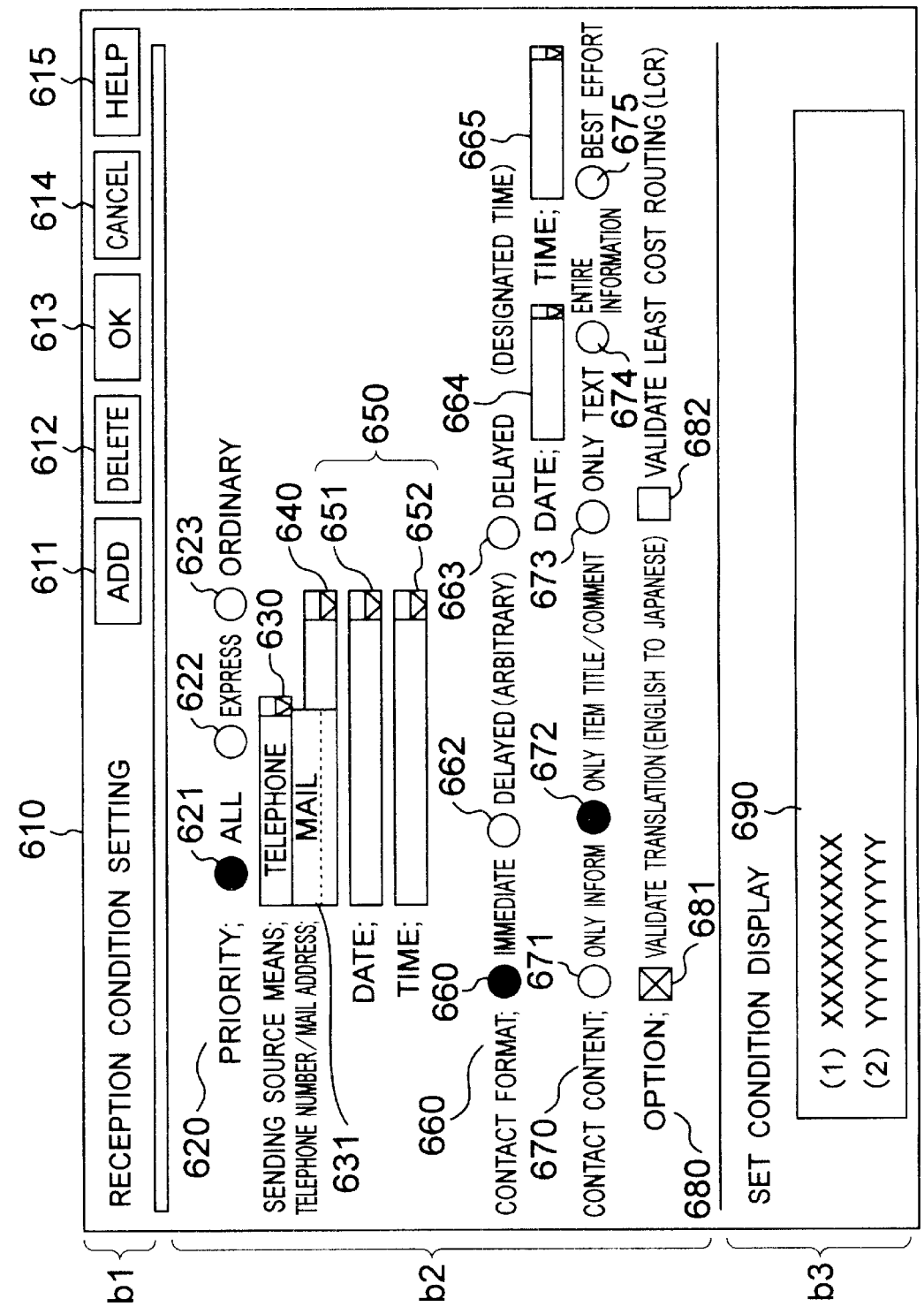
FIG. 6 is an explanatory view showing an example of a scene for the operation of setting/changing the reception condition from the PC client side.

The condition setting start portion 551 is defined as a software key. Accordingly, by clicking this region, a program and data prepared in advance for the contact manager program 312 can be sent to a PC client to achieve condition setting GUI. Specifically, GUI shown in FIG. 6 is sent to a PC client as will be described later. Then, the contact manager program 312 accepts an operation through the GUI and processes the setting of the reception condition.

The set condition display portion 554 is a region for displaying conditions set by the condition setting GUI which will be described later. When a plurality of conditions are set in accordance with the contact means 5521 to 5523, the plurality of conditions can be displayed. In the example shown in FIG. 5, two conditions are displayed in accordance with the contact means (1) and (2). Incidentally, the number of conditions allowed to be displayed is not limited thereto. When all conditions cannot be displayed, conditions not displayed may be displayed by scrolling.

The reception condition setting GUI shown in FIG. 6 is configured so that information received by a contact means selected on the basis of the GUI shown in FIG. 5 is set more finely by a receiver. Dividing roughly, the reception condition setting GUI shown in FIG. 6 has three areas. That is, an area b1 for performing instructions concerning the reception condition setting, an area b2 for performing inputting for reception conditions of the contact, and an area b3 for displaying conditions set in the area b2, are displayed on a setting screen. Regions called "buttons" for performing operations and settings and character/symbol input regions for inputting characters or symbols are arranged in these areas. A function of inputting an instruction concerning a procedure defined by each of the buttons is fulfilled when the position of the button region is clicked, for example, by a mouse. The operation through the GUI shown in FIG. 6 is carried out by a receiver to thereby set the content of the table shown in FIG. 8.

The area b1 is an area for performing various instructions concerning reception conditions. An ADD button 611 for performing an add instruction, a DELETE button 612 for performing an instruction to delete the existing setting of a specific reception condition, an OK button 613 for instructing the confirmation of the reception condition which has been already set, a CANCEL button 614 for instructing the cancellation of the setting and a HELP button 615 for accepting a request to display a guide message for the operation are arranged in the area b1.

A priority designation portion 620 for designating the aforementioned priority, a sending means input portion 630 for inputting the designation of a sending means in the sending source, an address input portion 640 for inputting telephone number, mail address, facsimile number, etc., a date input portion 650 for inputting the designation of date, a contact format designation portion 660 for designating the contact format, a contact content designation portion 670 for designating the contact content, and an option input portion 680 for inputting the designation of option items, are arranged in the area b2.

In the priority input portion 620, ALL 621 for accepting all formats, EXPRESS 622 for accepting only reception designated as express mail and ORDINARY 623 for accepting reception designated as ordinary mail can be designated. These designations can be made by clicking the corresponding regions. FIG. 6 shows an example where ALL 621 is designated. Accordingly, the display format of ALL 621 is made different from the other format.

The sending means input portion 630 is provided as a region for performing inputting for designating a sending means specifically. Not only a sending means can be designated by inputting of characters or symbols directly to the input portion 630 but also a selection menu 631 can be provided in the input portion 630 by displaying means prepared in advance or inputted in the past as shown in FIG. 6.

A region for inputting telephone number, mail address, etc. for each means in the sensing source is provided in the address input portion 640. Not only characters, symbols and/or codes can be inputted directly to the input portion 640 but also the aforementioned menu (not shown) may be provided in the input portion 640 for selective inputting.

A date input portion 651 for inputting the desired date of reception and a time input portion 652 for inputting the desired time of reception are provided in the date input portion 650.

An input portion for setting the timing of contact is provided in the contact format designation portion 660. The input designating operation and the display of the operating result are the same as the aforementioned contact-enabled/ disabled designation input. In FIG. 6, suitable one can be selected from IMMEDIATE 661, DELAYED (arbitrary) 662 for delaying contact for an arbitrary time and DELAYED (designation) 663 for delaying contact for a designated time. Further, input portions 664 and 665 are provided for designating the date and time of contact when DELAYED (designation) is designated.

Incidentally, there is some case where the designation of the contact format in the contact format designation portion 660 is nonsense in terms of the characteristic of reception means as shown in FIG. 13 which will be described later. Accordingly, in the GUI program, nonsense choices among all choices in the contact format designation portion 660 are preferably inactivated in the system side in advance with reference to information shown in FIG. 13 when a reception means is designated.

The contact content designation portion 670 is a region for accepting an input for designating the degree of the content to be transmitted. Regions of ONLY INFORM 671, ONLY ITEM TITLE/COMMENT 672, ONLY TEXT 673, ENTIRE INFORMATION 674 and BEST EFFORT 675 for performing conversion as sufficiently as possible are provided in the contact content designation portion 670. Any of those designations is selectively accepted in the corresponding region.

Incidentally, the content of contact in the contact content designation portion 670 is limited in terms of the characteristic of reception means, for example, as shown in FIG. 11 which will be described later, so that there is some case where the designation of the contact content is nonsense. Accordingly, in the GUI program, nonsense choices among all choices in the contact content designation portion 670 are preferably inactivated in the system side in advance with reference to information shown in FIG. 11 so that the nonsense choices cannot be selected by the receiver when a reception means is designated.

TRANSLATION VALIDITY (English to Japanese) 681 for performing designation to validate translation and LEAST COST ROUTING (LCR) 682 for performing designation to validate least cost routing are provided in the option input portion 680. By clicking a process to be designated, the designation is accepted. The accepted process is marked with "X" which shows the acceptance of the designation.

A set condition display portion 690 is arranged in the area b3. The set condition display portion 690 is a region for displaying conditions set as described above. Although FIG. 6 shows the case where two conditions are displayed, the present invention is not limited thereto. The same display content as in FIG. 5 is displayed.

A procedure for setting a contact reception environment by use of the aforementioned GUI will be described below with reference to FIG. 4.

This process is started when a user uses a WWW browser of a PC client to make access to a contact reception environment screen by logging-on. That is, when the aforementioned access from a PC client is made, the contact manager program 312 is started. The program 312 carries out a process for accepting the access as a request to start the setting or changing of contact reception-environment information to thereby make the setting operation in the PC client possible (step 401). That is, when the aforementioned access is made, the CTI server 300 is connected to the internet server 205 through the LAN 207 from the PC client or through the telephone network TCN. The internet server 205 communicates with the contact manager program 312 of the CTI server 300 on the basis of the accessed address. After user certification by password, a program and data for providing the contact reception-environment setting GUI shown in FIG. 5 are loaded into the PC client which is an access source.

Then, the contact manager program 312 accepts the setting or changing operation from the user on the contact reception-environment setting GUI and executes a setting or changing process in accordance with an instruction designated by the operation (steps 402, 403 and 404). That is, firstly, the setting for validating or invalidating contact adjustment execution is accepted (step 402). Secondly, the setting of a contact point, the setting of validating schedule association for automatically reflecting whereabouts registered in schedule management in association with the schedule management function of the contact manager, the setting of contact-enabling/disabling, and the setting for storing a message in the case of contact-disabling or in the case of out-of-condition are accepted (step 403). Specifically, in this step, the setting of a recording means for recording information such as a message, or the like, for example, the setting of a message box, a mail box, and a facsimile information storage, and the setting of the contact point of the recording means are accepted. Thirdly, the setting of contact-enabled means in accordance with location such as place of business trip, place of work or home, and the setting of telephone number and/or mail address indicating a contact point for access to each contact-enabled means are made (step 404). Examples of the contact means include a telephone, a facsimile equipment, a mail, a portable telephone, and a pocket bell or pager. Further, a plurality of contact means can be set as information-reception-enabled means from a plurality of means. The setting of the work place is essential in the setting of information indicating a contact point, so that the mail address and telephone number of the work place are automatically set as an opened main mail address and a telephone number.

Then, the contact manager program 312 accepts the setting as to whether setting is terminated in the state already set or whether contact by the set contact means is made under a certain condition (steps 405a and 405b). That is, when the OK button 511 is clicked, the reception-environment setting screen (GUI) is terminated (step 409). On the other hand, when the condition setting button 551 is clicked, the contact manager program 312 sends a program and data to the PC client for providing the reception condition setting GUI shown in FIG. 6. Then, the operation of inputting to the reception condition setting GUI shown in FIG. 6 is accepted (step 406).

In the reception condition setting GUI, the setting of the priority (EXPRESS, ORDINARY, ALL) of the transmission message, sending source means, sender telephone number or mail address, and the date of reception of the transmission message is accepted as a filter condition for the message to be transferred. Further, the contact format (IMMEDIATE, DELAYED, DELAYED for a designated time) in data transfer, the content of contact (only inform, only item title or comment, only text, entire information, and Best Effort), and option designation (validating translation, validating least cost routing) are set and the operation of setting a necessary condition group by clicking the ADD button 611 and the DELETE button 612 is accepted (step 407).

Incidentally, in the setting of the contact format, the display of choices which cannot be selected by the contact means set previously is inactivated. Accordingly, choices in activated display are accepted. When, for example, the contact means is telephone, facsimile or portable telephone, the display of the DELAYED format is inactivated. When, for example, the contact means is mail, the display of the IMMEDIATE format is inactivated. When, for example, the contact 25 means is a pocket bell or pager, both the display of the DELAYED format and the display of the "DELAYED for a designated time" format are inactivated.

When clicking of the OK button 613 is accepted after the condition setting is terminated, the situation of the procedure goes back to the environment setting GUI (step 408). Here, the procedure from the step 405a is repeated. When the OK button 511 is clicked, the environment setting is terminated (step 409). The reception environment data set by clicking of the OK button 511 are sent to the CTI server 300 through the internet server 205 and stored, in the form of a user contact information table shown in FIG. 7 and a user location contact condition information table shown in FIG. 8, in the user contact information database 304 by the contact manager program 312.

Setting or changing of the contact reception-environment information from telephone or facsimile will be described below. FIG. 9 is an operational flow chart in the case where contact reception-environment information is set or changed from telephone or facsimile.

When a user makes a dial call from telephone or facsimile to a contact reception-environment setting or changing service, a starting instruction is accepted in response to the dial call (step 901). That is, in the case of a call from the telephone network TCN, the PBX/ACD control program of the PBX 202 and the CTI server 300 informs the system execution management program 317 of the detection of the call. On the other hand, in the case of a call from the internet ITN, the internet server control program 314 of the internet server 205 and the CTI server 300 informs the system execution management program 317 of the detection of the call. The system execution management program 317 informed of the detection of the call starts the contact manager program 312. The contact manager program 312 uses the IVR program 310 to induce logging into the contact reception-environment setting or changing service by password certification on the basis of voice inputting or keypad inputting of telephone or facsimile.

Then, the contact manager program 312 uses the IVR program 310 to convert the reception-environment setting or changing menu preliminarily stored in the voice database 303 into voice to thereby make voice response to a receiver of telephone or facsimile (setting of entire information and changing of designated information) (step 902). That is, speech response is given to the user. The number of the menu given by keypad inputting or voice inputting is received from the user, so that the designation of selection of the menu is accepted (step 903). Further, the contact manager program 312 uses the IVR program 310 so that a guide message registered in the voice database 303 in accordance with each information item of reception-environment information concerning the selected menu is given as voice response to the user. A replay given from the user by keypad inputting or voice inputting in the manner of successive confirmation is accepted. Setting or changing is performed on the basis of the replay from the user (step 904).

After information setting or changing is completed, a question as to whether setting or changing is to be further continued or terminated is given to the user by speech by use of the IVR program 310. A reply to this question is accepted by keypad inputting or voice inputting (steps 905, 906 and 907).

Incidentally, the reception-environment information set by voice inputting in this operation is subjected to voice recognition by the IVR program 310. All the set data are stored integrally in the user contact information database 304 by the contact manager program 312 in the same manner as in the case of setting from the PC client.

Figure 10:
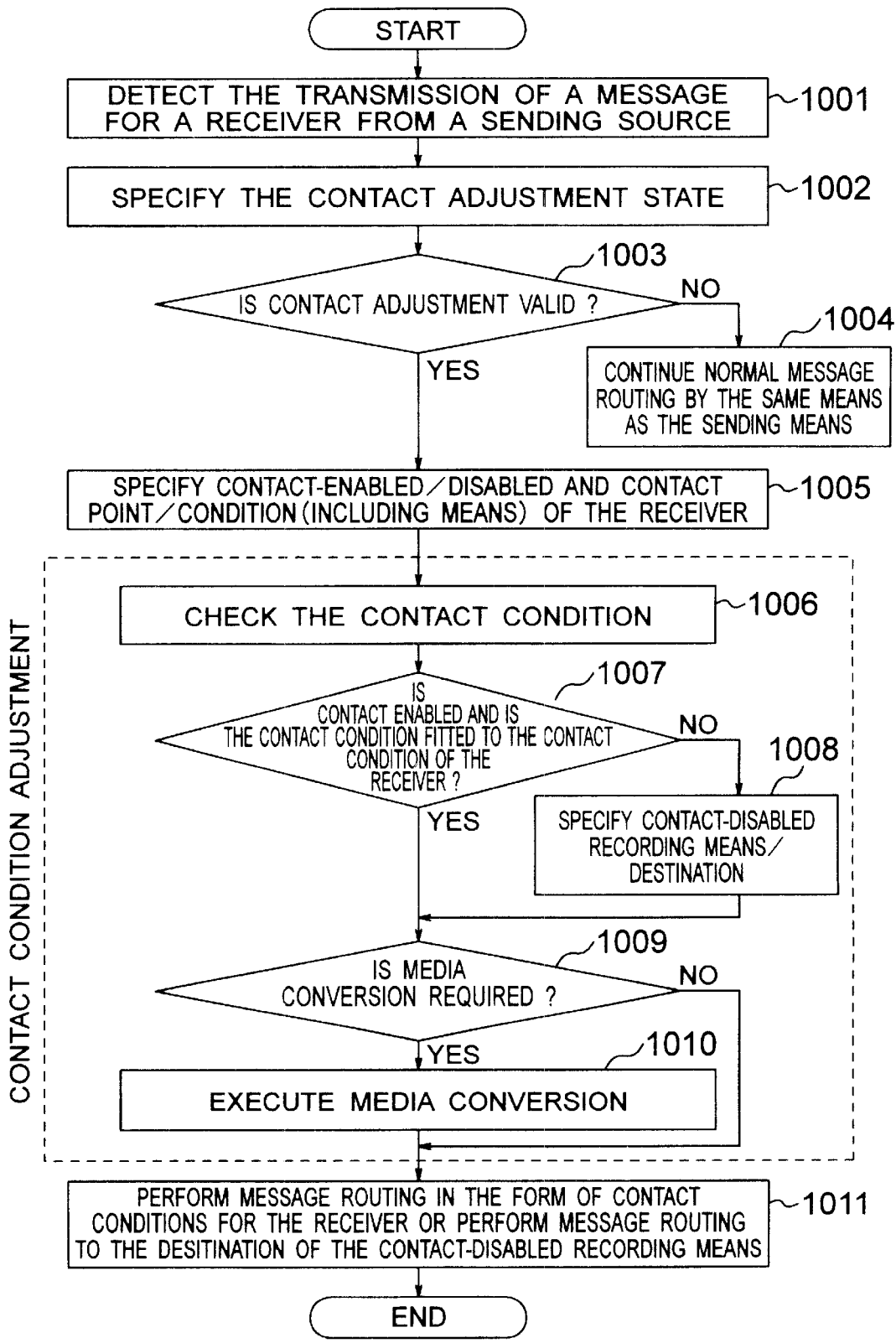
FIG. 10 is a flow chart showing the operation of routing a message in a CTI server according to the present invention.

Next, the operational flow of a message routing process by the CTI server 300 will be described below with reference to FIG. 10.

First, the CTI server 300 detects transmission from the outside, receives a message given to the receiver from the sending source, stores the message in the work memory 305 and informs the system execution management program 317 of the detection of the transmission message (step 1001). In this process, a program corresponding to the sending means in the sending source performs a process of receiving the message and delivers the process to another program. As shown in FIG. 3, in the case of a call from a telephone or a facsimile equipment, the PBX/ACD control program 309 detects the transmission via the PBX/ACD 202 and the PBX interface 301. In the case of internet, the internet server control program 314 detects the transmission via the internet server 205 (see FIG. 2) and the LAN interface 302. Then, the sending means, sender telephone number, sender mail address, receiver telephone number information (ANI/DNIS), receiver mail address, sending date and priority are collected in each of the programs. Further, the electronic mail sent from a PC is detected by the groupware control program 313 via the groupware server 203 and the LAN interface 302. The groupware control program 313 collects the sender mail address, priority, sending date and receiver mail address. These programs store the collected information as transmission message information (the sender telephone number or address; sending means; priority [always handled as EXPRESS in the case of telephone or facsimile] sending date; receiver telephone number or address) in the work memory 305. Further, the PBX/ACD control program 309, the internet server control program 314 or the groupware control program 313 informs the system execution management program 317 of the detection of the transmission message.

Then, the system execution management program 317 specifies the contact adjustment state of the receiver (step 1002). This specification is achieved as follows. The system execution management program 317 retrieves opened main telephone number 702 or opened main mail address 703 from the user contact information table 700 (see FIG. 7) on the user contact information database 304 on the basis of the receiver telephone number or receiver mail address stored in the work memory 305 and specifies a coincident contact adjustment state 704. Here, a judgment is made as to whether the contact adjustment state is valid or not (step 1003). If the contact adjustment state is valid, the system execution management program 317 starts the telephony agent program 311. On the contrary, if the contact adjustment state is invalid, the system execution management program 317 stops the processing of the message to the destination, deletes information concerning the destination from the work memory 305, and informs the PBX/ACD control program 309, the internet server control program 314 or the groupware control program 313 of the execution of normal routing in the same manner as the sending means (step 1004).

Then, the telephony agent program 311 specifies the contact-enabled/disabled state, contact means, contact point and contact condition of the receiver (step 1005). This specifying operation is achieved as follows. The telephony agent program 311 searches the user contact information table 700A in the same manner as in the specifying operation of the contact adjustment state. Description will be made about the case where, for example, a sender S sends an EXPRESS text mail to receivers A, B and C from a PC as shown in FIG. 1. In this case, the user contact information table 700A is searched by using the mail addresses A-aaa, B-bbb and C-ccc of the receivers A, B and C, so that information is specified as follows.

Receiver A: contact enabled/disabled=enabled, contact means=portable telephone, contact point=AA22, contact condition=(priority=ALL, sending means=ALL, sending source telephone number/address=ALL, date=ALL, contact format=IMMEDIATE, contact content=Best Effort, option=None); (shown as "XXXXXXX" in FIG. 7);

Receiver B: contact enabled/disabled=enabled, contact means=facsimile, contact point=BB22, contact condition=(priority=EXPRESS, sending means=ALL, sending source telephone number/address=ALL, date=ALL, contact format=DELAYED, contact content=Best Effort, option=None); (shown as "ZZZZZZZ" in FIG. 7); and Receiver C: contact enabled/disabled=enabled, contact means=mail, contact point=C-ccc, contact condition=(priority=ALL, sending means=ALL, sending source telephone number/address=ALL, date=ALL, contact format=DELAYED, contact content=Entire Information, option=None); (shown as "VVVVVV" in FIG. 7).

Then, the telephony agent program 311 checks whether the transmission message information on the work memory 305 satisfies the contact condition such as priority, sending means, sending source telephone number or address, date, and contact content or not (step 1006). The term "check of the contact content" used herein means a check as to whether the contact content is in a range of limitation in accordance with the difference in media between the message sending means and the message receiving means as shown in FIG. 11.

The content of checking shown in FIG. 11 is defined in the telephony agent program 311 or prepared as reference data and stored in the program memory 318. The example shown in FIG. 11 is an example in which telephone or portable telephone, mail (text mail, voice mail or facsimile mail) and facsimile are assumed as sending means whereas telephone or portable telephone, mail, facsimile and pocket bell or pager are assumed as receiving means respectively correspondingly to the above-mentioned sending means. In FIG. 11, levels concerning the limitation are expressed as A, B, C, D and E for convenience of expression. Here, level A can be used only to "inform", level B can be used up to "Item Title or Comment", level C can be used up to "Text", level D can be used up to "Best Effort", and level E can be used up to "Entire Information".

Then, the telephony agent program 311 judges whether contact is enabled or not and whether the contact condition is satisfied or not (step 1007). If it is proved that the contact is enabled and the contact condition is satisfied, the situation of the procedure goes to step 1009. On the other hand, if it is proved that the contact is disabled or the contact condition is not satisfied, the contact-disabled recording means/contact-point information 707 on the user contact information table 700A is specified and the situation of the procedure goes to the next step (step 1008). In the aforementioned example, contact with each of receivers A, B and C is enabled and the contact condition is satisfied because the transmission message information is sender telephone number/address=S-sss, sending means=mail, priority=Express, the date of sending=xxxxx. Accordingly, the situation of the procedure goes to step 1009.

Then, the telephony agent program 311 judges the necessity of media conversion due to the difference between sending means and receiving means and the classification of conversion on the basis of the correspondence in the classification of conversion shown in FIG. 12 both in the case where the contact condition is satisfied and in the case where contact is disabled (step 1009).

The correspondence in the classification of conversion shown in FIG. 12 is defined in the telephony agent program 311 or prepared as reference data and stored in the program memory 318. The correspondence shown in FIG. 12 is an example in which telephone or portable telephone, mail (text mail, voice mail or facsimile mail) and facsimile are assumed as sending means whereas telephone or portable telephone, mail, facsimile and pocket bell are assumed as receiving means respectively corresponding to the above sending means. In the respective correspondence, conversion into a necessary expression format is designated.

When it is proved that the conversion of the transmission message is required, the telephony agent program 311 executes necessary conversion with reference to the correspondence shown in FIG. 12 (step 1010). Incidentally, the conversion is performed by use of exclusive-use processing boards 306, 307 and 308.

When, for example, it is proved in the step 1009 that the conversion of the expression format for the receiving means is required, the transmission message is loaded to the CTI server 300 from the groupware server 203 in the case where the transmission message is a mail, or from the PBX/ACD 202 or the internet server 205 in the case where the transmission message is a telephone or facsimile call. The IVR program 310 sends the transmission message to corresponding one of the boards such as a character recognition board 306, a TTS (text to speech) processing board 307 and an ASR (speech to text) processing board 308. Further, if the contact condition is satisfied, media conversion is executed in accordance with the designation of the contact content. If contact is disabled, media conversion is executed in accordance with the designation of "Best Effort". Results of the conversion are stored in the work memory 305 (step 1010). If conversion is not required, the situation of the procedure goes to the next step. For example, in the aforementioned case where the transmission message is a text mail, text-to-speech conversion is executed in accordance with "Best Effort" for the receiver A having the receiving means of potable telephone, text-to-image conversion is executed in accordance with "Best Effort" for the receiver B having the receiving means of facsimile, and conversion is not required for the receiver C having mail as the receiving means because the sending means and the receiving means are coincident with each other.

Finally, the telephony agent program 311 routes the message destined for receivers satisfying the contact condition by the classification of processing corresponding to the receiving means and the contact format designation of the contact condition shown in FIG. 13 and executes processing designated on the user contact condition information table 800 shown in FIG. 8 if necessary (step 1011). That is, a process for adding designated processing to the transmission message on the work memory 305, on the groupware server 203, on the PBX/ACD 202 or on the internet server 205 is executed if the message range and option are designated in the contact content designation. Then, the message is routed to the receivers by execution of the automatic call distribution control of the PBX/ACD 202 based on the PBX/ACD program 309, the call routing control based on the internet server control program 314 or the mail routing control of the groupware server 203 based on the groupware control program 313. Examples of the option designation include selection of English-to-Japanese translation and selection of least cost routing (LCR) processing of the PBX function or LCR processing for selecting an internet-using process when transfer can be made through internet telephone/facsimile.

In the aforementioned case, as shown in FIG. 1, a call is sent to the receiving means which is a portable telephone of the receiver A by immediate transfer processing, so that the transmission message after text-to-speech conversion is read aloud to the receiver A. A call is sent to the receiving means which is a facsimile equipment of the receiver B by immediate transfer processing, so that the transmission message after text-to-image conversion is outputted. Further, the transmission message is directly transferred to the mail address of the receiving means which is mail means of the receiver C by delayed transfer processing.

Further, the transmission message for a contact-disabled receiver is routed to the destination of the contact-disabled recording means, that is, the transmission message on the work memory 305, on the groupware server 203, on the internet server 205 or on the PBX/ACD 202 is routed by execution of a corresponding program, that is, execution of the automatic call distribution control of the PBX/ACD 202 in accordance with the PBX/ACD program 309, the call routing control in accordance with the internet server control program 314 or the mail routing control of the groupware server 203 in accordance with the groupware control program 313 (step 1011). Incidentally, recording to the message box is achieved by storing the transmission message in the voice/facsimile database 303 in accordance with the IVR program 310, and recording to the facsimile information storage is achieved by storing the transmission message in the voice/facsimile database 303 in accordance with the facsimile control program 315. With respect to these messages, a receiver can make access to the CTI server 300 from telephone, facsimile or PC later so that the receiver can verify the transmission message recorded at the contact-disabled time from the voice/facsimile database 303 in accordance with the IVR program 310.

By the aforementioned configuration and operation, message routing in accordance with the receiving means and contact condition allowed to be used at the contact point can be provided to the user without depending on the message sending means. Accordingly, a multimodal communication environment can be constructed in an office environment in which various offices such as a home office, a mobile office, etc. are connected by a communication network. As a result, the user can make communication by means allowed to be used by himself/herself at the point of time regardless of the location of the user in the office environment. Furthermore, both the relaxation of limitation in the communication means and the degree of freedom in selection of means are given to the user, so that both speediness and efficiency in office work are attained. Further, the existing telephone network environment can be utilized effectively, so that there is no necessity of introducing an integrated system into all the office environment and there is no necessity of providing any means added to the communication means for the user individually. Accordingly, a low-cost total information transfer/information sharing environment can be constructed and developed easily.

Another embodiment of the present invention will be described below with reference to FIGS. 2, 3, 14 and 15. The embodiment in FIGS. 14 and 15 shows, as an example, a system which can be applied not only to human-to-human message routing for human users but also to work system communication such as human-to-work system communication, or work system-to-work system communication.

Figure 14:
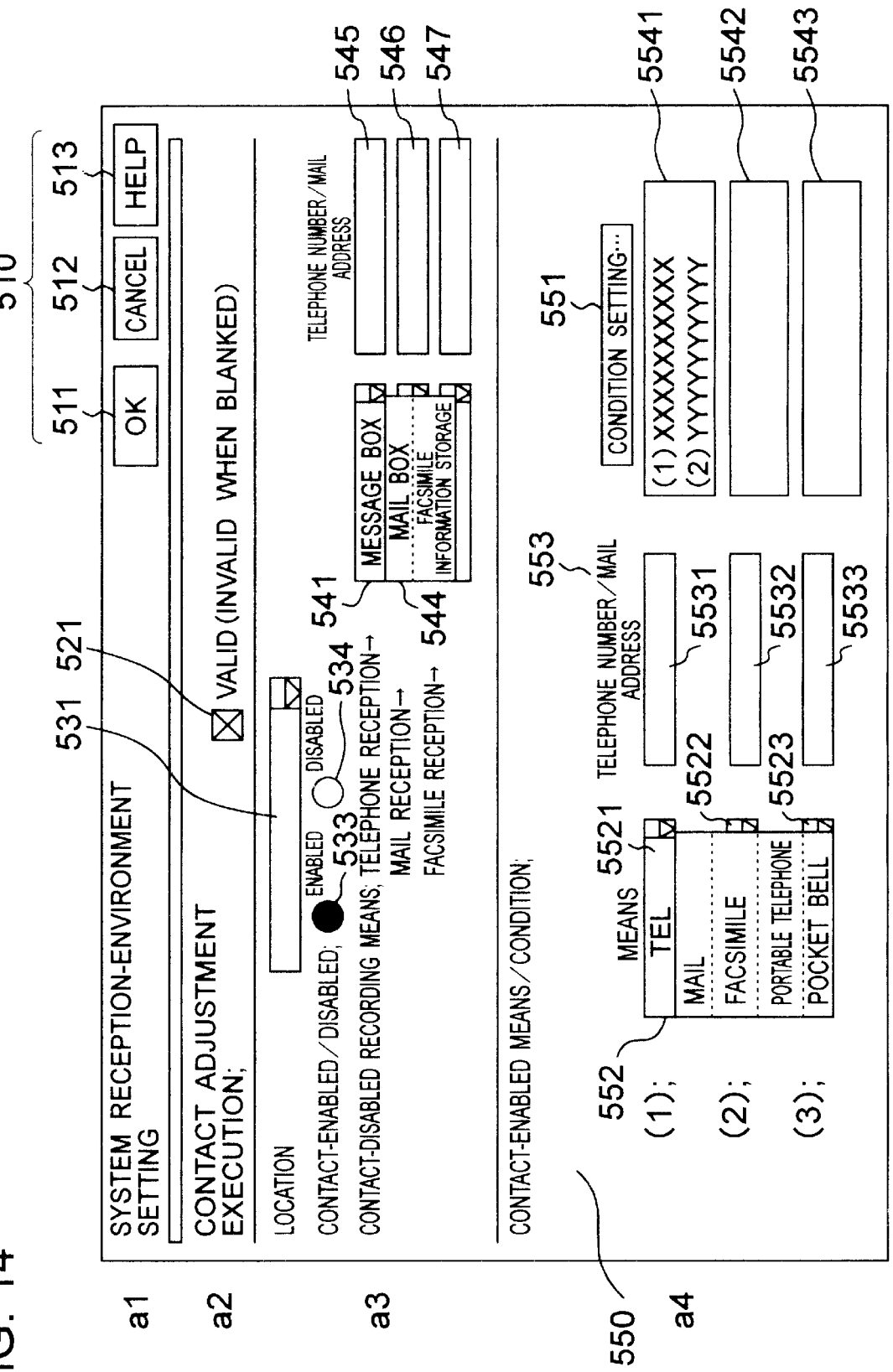
FIG. 14 is an explanatory view showing an example of a scene for the operation of setting/changing the system reception environment.

The system configuration and operation are basically the same as in the embodiment shown in FIGS. 4 through 13, except the operation of setting or changing contact reception-environment information, that is, except that a manager of the work system sets or changes environment information and except that access from the browser of the PC client for the setting or changing process is made to a system reception-environment setting screen shown in FIG. 14. That is, in the case of a work system, the location or whereabouts is not changed dynamically in comparison with the reception-environment setting screen in the case where the user is a human being. Accordingly, both the designation of automatic whereabouts-changing in association with the schedule management function of the contact manager program 312 and the setting of contact-enabled means or contact condition in accordance with the location or whereabouts are not required. Further, this applies also to the setting or changing process of the reception environment from telephone or facsimile.

Incidentally, the basic configuration of the system reception-environment setting GUI in FIG. 14 is the same as the GUI shown in FIG. 5 except the aforementioned points of difference, so that the same parts of FIG. 14 as those in FIG. 5 are correspondingly referenced for omission of duplicated description.

In the setting process through the system reception-environment setting GUI shown in FIG. 14, the setting and changing is performed by the system manager as described above, so that the necessity in response to another user's request from the outside in the same manner as in the contact reception-environment setting GUI shown in FIG. 5 is eliminated. Accordingly, the contact manager program 312 of the CTI server 300 sends a program and data for providing the GUI of FIG. 14 to the PC client 209 in response to access from the PC client 209 of the system manager in the LAN 207. As a result, setting can be made in the same manner as in the GUI of FIG. 5. Alternatively, the program and data for providing the GUI of FIG. 14 may be stored in the PC client 209 of the system manager in advance.

The reception environment data thus set are stored, in the form of a system contact information table 700B shown in FIG. 15, in the user contact information database 304. The inputting of information, for example, to an ordering/stock management system or purchase system on the business application server 204 or to an examination/approval workflow system on the groupware server 203 is executed by the groupware control program 313 or the business application control program 316 in the CTI server 300 on the basis of the set information on the table 700B.

The configuration of the system contact information table 700B is basically the same as that of the user contact information table 700A in FIG. 7. Accordingly, the same parts are correspondingly referenced for omission of duplicated description. Incidentally, the difference between the tables 700A and 700B is only a difference in information set therein. For example, user name 7012 is shown on the table 700A whereas system name 7012 is shown on the table 700B. This is because of a difference between subjects of information reception, but the two tables 700A and 700B are quite the same in terms of the information for specifying the subjects of information reception. Accordingly, the two tables A and B may be combined into a single table.

By the aforementioned configuration and operation, reception-environment information in each work system can be also registered in the user contact information database in the same manner as in the case where the user is a-human being. Accordingly, message routing in accordance with receiving means can be achieved also in the case where subjects of communication are not only human beings but also information systems.

A further embodiment of the present invention will be described below with reference to FIGS. 2, 3, 7 and 10 and FIGS. 16 through 19. This embodiment shows the case where message routing is performed while the sending side selects and sets the contact transmission condition from the contact reception condition of the receiving side so that the contact request condition on the message sending side is also reflected.

The system configuration and operation in this embodiment are basically the same as those in the embodiments shown in FIGS. 4 through 13, except the following point of difference in the operation. That is, a process for setting or changing the contact transmission environment is added to the process for setting or changing the reception environment. For the process for setting or changing the contact transmission environment, the contact manager program 312 prepares a program and data for achieving the contact transmission-environment setting GUI in the PC client. The contact manager program 312 sends the program and data to the PC client in accordance with a request from the PC client.

Figure 17:
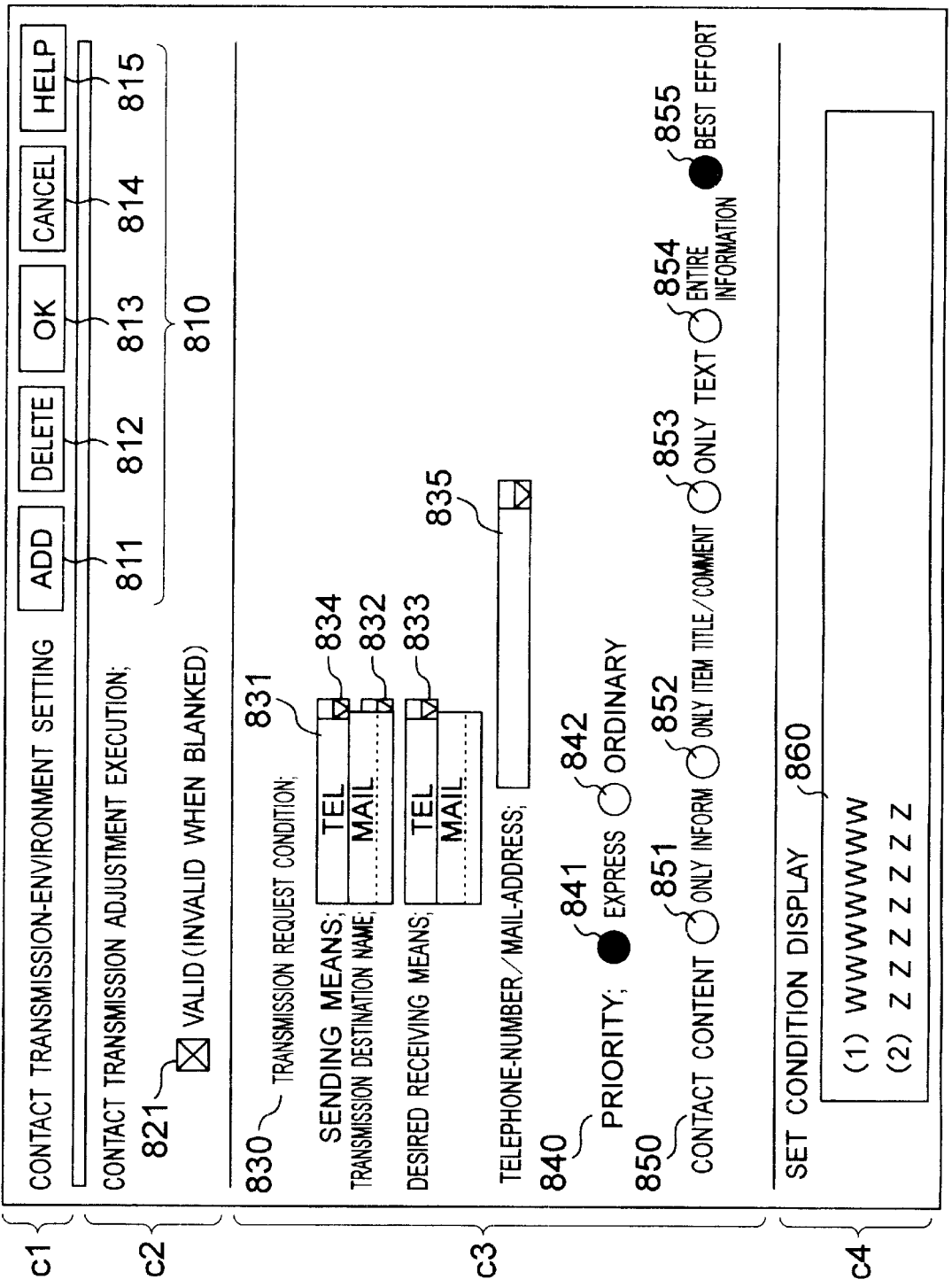
FIG. 17 is an explanatory view showing an example of a scene for the operation of setting/changing the contact transmission environment from the PC client side.

FIG. 17 shows an example of the contact transmission-environment setting screen through the contact transmission-environment setting GUI. This GUI roughly has four areas. That is, an area c1 for making an instruction concerning the setting of the contact transmission environment, an area c2 for setting the validity of execution of contact adjustment, an area c3 for setting the transmission request condition and an area c4 for displaying set conditions are displayed on a setting screen. Regions called "buttons" for carrying out operations and settings and character/symbol input regions for inputting characters or symbols are arranged in these areas. When the position of each of the button regions is clicked by a mouse, or the like, a function of inputting an instruction concerning an operation defined in the button is exhibited.

The area c1 is an area for carrying out various instructions concerning the transmission condition. An ADD button 811 for making an adding instruction, a DELETE button 812 for making an instruction to delete the existing setting of a specific reception condition, an OK button 813 for making an instruction to confirm the set reception condition, a CANCEL button 814 for making an instruction to cancel the setting and a HELP button 815 for accepting a request to display a guide message concerning the operation are arranged in the area c1.

Contact transmission adjustment execution input regions are provided in the area c2 for performing setting on the transmission-environment setting screen as to whether execution of contact adjustment is valid or not. When each of the input regions is clicked, the input region is marked with the symbol "X" showing an instruction to validate the execution.

A transmission request condition input portion 830 for inputting the designation of the transmission request condition for the sending means in the sending source, a priority designation portion 840 and a contact content designation portion 850 are arranged in the area c3. Regions for inputting sending means 831 classified by contact point, designation name 832, desired receiving means 833 and telephone number or mail address 835 for the means are arranged in the transmission request condition input portion 830. Designation items can be inputted in these regions by a character or a symbol through a keyboard, or the like. Further, designation can be inputted through a menu 834 for displaying designation items prepared as references in advance or items designated in the past and selectively designating one of the items.

Regions for accepting the designation of either EXPRESS 841 or ORDINARY 842 are provided in the priority designation portion 840. When either region is selected, the display format of the selected region is changed. In FIG. 17, the selected region is painted out with one color.

Regions for accepting inputs for designating the degree of the content to be transmitted are provided in the contact content designation portion 850. That is, regions of "only inform" 851, "only item title or comment" 852, "only text" 853, "entire information" 854 and "Best Effort" 855 are provided in this portion 850. The designation of selection of any one of these regions is accepted.

A set condition display portion 860 for displaying set conditions designated by the aforementioned regions is provided in the area c4.

The designations or settings thus inputted in FIG. 17 are stored in the user contact transmission condition information table 800 shown in FIG. 18. User number 8011 as an identifier for indicating a user, contact adjustment state information 802 for indicating whether adjustment for transmission of information on the receiving side is valid or not, sending means information 803 which is information indicating sending means, destination name information 804 for indicating an destination and contact request condition information 805 for indicating contact request conditions are stored in the table shown in FIG. 18.

Desired receiving means information 8051 for specifying a desired means for receiving information to be transmitted, receiving-side telephone-number/address information 8052 for indicating telephone number or mail address of a receiving side, priority information 8053 for indicting priority, and contact-content information 8054 for indicating the designation of the contact content, are set in the contact request condition information 805. The setting items in these regions are the same as in the case of the table shown in FIG. 7, so that duplicated description will be omitted.

A process for setting or changing the contact transmission-environment information in this embodiment will be described below with reference to FIG. 16. FIG. 16 is an operational flow chart of the process for setting or changing the contact transmission-environment information from the PC client.

First, this process is started when a user makes access to the contact transmission-environment setting screen from a WWW browser of a PC client by logging-on. That is, if the aforementioned access is made from a PC client, the contact manager program 312 is started. The program 312 carries out a process for accepting the access as a request to start the process for setting or changing the contact transmission-environment information so as to make the setting operation in the PC client possible (step 1601). That is, if the aforementioned access is made, the CTI server 300 is connected to the internet server 205 through the LAN 207 or telephone network TCN from the PC client. The internet server 205 communicates with the contact manager program 312 of the CTI server 300 on the basis of the accessed address. After user certification based on password, a program and data for providing the contact transmission-environment setting GUI shown in FIG. 17 are loaded into the PC client of the access source.

Then, the user's setting is accepted on the PC client through the transmission-environment setting screen of the transmission-environment setting GUI as to whether execution of contact adjustment is valid or not (step 1602). Further, the setting of contact transmission request conditions, such as sending means classified by contact point, destination name, desired receiving means, telephone number or mail address to the means, priority, and contact content is accepted on the same screen (step 1603). Here, among the setting items for the contact transmission request conditions, only items satisfying the contact reception condition on the receiving side are displayed so as to be activated as selection items. That is, if a sending means and a transmission destination name on the sending side are inputted, information, such as contact adjustment state, contact-enabled/disabled, contact-enabled means, contact point and contact condition, corresponding to the destination name on the user contact information table 700A in the user contact information database 304 is retrieved by the contact manager program 312 in the CTI server 300. When the retrieval result shows the case where the contact adjustment state is invalid or contact is disabled, all setting items except the sending means and the transmission destination name on the sending side are displayed so as to be inactivated. Otherwise, items satisfying the retrieved information such as contact-enabled means, contact point and contact condition are selectively displayed so as to be activated.

If the clicking of the OK button 813 is then accepted, the environment setting of the contact transmission environment is regarded as being completed and the environment setting is terminated (step 1604). The transmission environment data which have been set are stored in the user contact transmission condition information table 800 of the format shown in FIG. 18 in the user contact information database 304 in the same manner as in the case of storage of the reception environment data in the embodiment shown in FIGS. 4 through 13. Further, the operation of setting or changing the transmission environment from telephone or facsimile is the same as in the case of the reception-environment setting in the embodiment shown in FIGS. 4 through 13, except the classification of items to be set and the number of items belonging to the contact transmission-environment information.

The operation of performing message routing process will be described below with reference to FIG. 19. As shown in FIG. 19, the point of difference from FIG. 10 which shows the case of only reception conditions is that a process concerning the adjustment of transmission conditions and reception conditions is added. The added process comprises: a process of specifying the sending-side state in specifying the contact adjustment state (step 1901); a process of judging whether the transmission contact adjustment is valid or not (step 1902); a process of specifying transmission/reception contact conditions (step 1903); a process of checking matching between the transmission conditions and the reception conditions (step 1904); a process of judging the above matching on the basis of the result of the checking process (step 1905); and a process of ORing the transmission contact condition items and the reception contact condition items (step 1906). Incidentally, the steps 1001 to 1011 are equivalent to the corresponding procedures in the flow chart of FIG. 10. Accordingly, the description of the procedures in the above steps will be omitted.

When contact condition adjustment between the sending side and the receiving side is not made by the aforementioned added process because the transmission contact adjustment state is invalid (step 1092), the situation of the procedure goes to step 1005. Further, when contact condition adjustment between the sending side and the receiving side cannot be made in the case where the transmission conditions mismatch with the reception conditions at the time of message transmission (step 1905) because the reception conditions are changed on the receiving side after the sender sets the transmission conditions, the situation of the procedure goes to step 1006 and message routing is executed only in accordance with the reception contact conditions in the embodiment shown in FIGS. 4 through 13. When the transmission contact adjustment state is valid and the transmission and reception conditions match with each other, message routing is executed in accordance with conditions obtained by ORing items designated in the transmission conditions and items not designated in the transmission conditions but designated in the reception conditions.

By the aforementioned configuration and operation, the sending side can designate contact conditions from the contact conditions set by the receiving side. Accordingly, message routing having high reliability in contact can be provided so that a request on the sending side is also reflected while conditions on the receiving side are made as a range of limitation.

A further embodiment of the present invention will be described below with reference to FIGS. 19 and 20. This embodiment shows an example of the case where message routing is executed so that contact reception conditions on the receiving side are automatically adjusted while contact request conditions in the message sending side are reflected in the contact conditions set by the receiving side.

Figure 20:
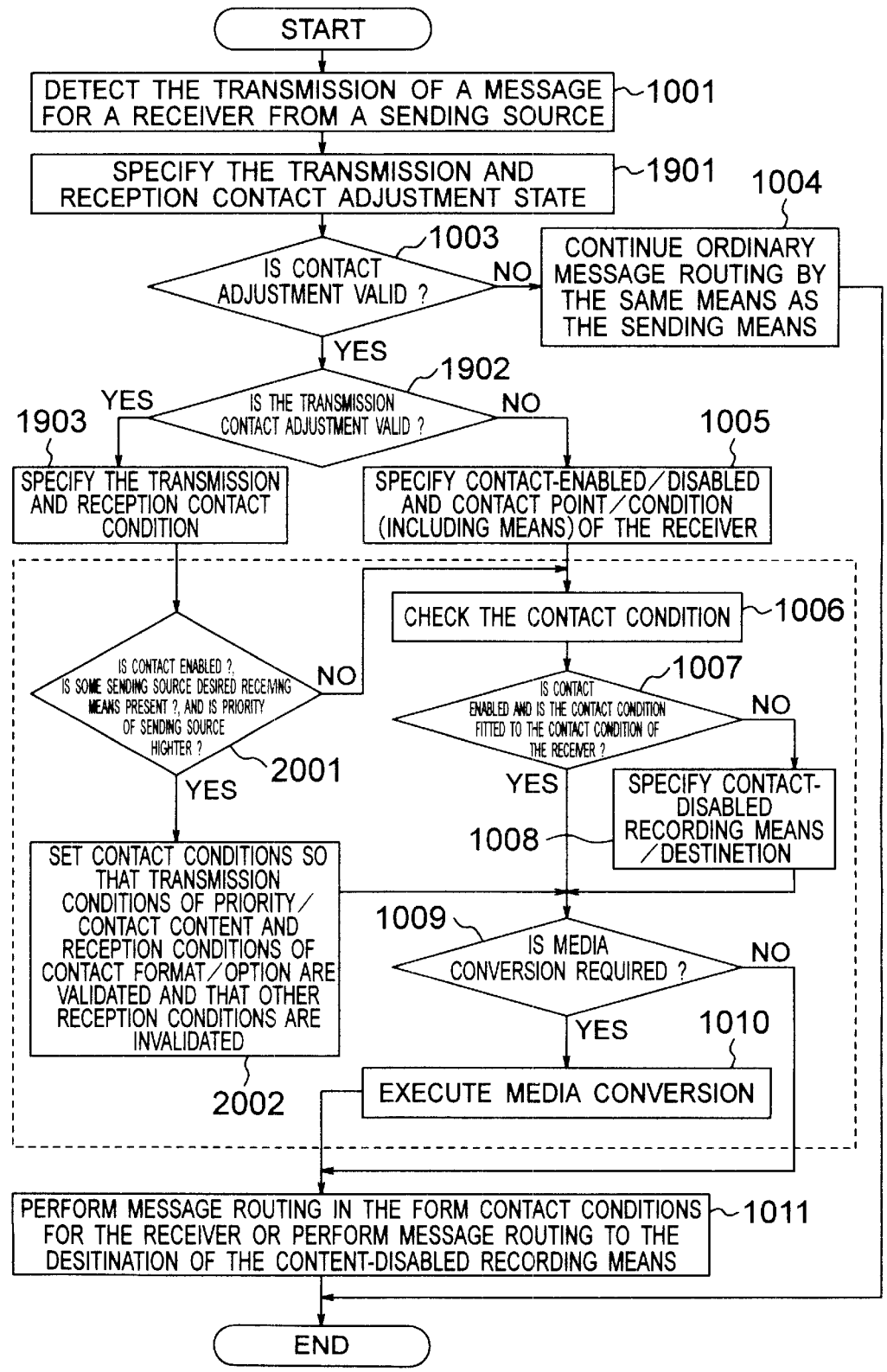
FIG. 20 is a flow chart showing the operation of routing a message in the case where the transmission condition is controlled automatically.

The system configuration and operation are the same as those in the embodiment shown in FIGS. 16 through 19, except the process of sender's setting or changing the contact transmission environment, that is, except that a request can be set freely in a standpoint on the sending side regardless of the range of limitation in the contact reception conditions set by the receiving side, and further except the operation for message routing, that is, further except that checking the matching between the transmission and reception conditions (step 1904), judging the matching (step 1905) and ORing contact condition items on the sending and receiving sides (step 1906) are replaced by judging contact-enabled/disabled, desired reception means and priority (step 2001) and adjusting contact conditions between the sending and receiving sides (step 2002) as shown in FIG. 20.

In the step 2001, a judgment is made as to whether contact is enabled or not. If contact is enabled, a judgment is further made as to whether the desired reception means exists or not. When there is some desired reception means, priority is further judged. That is, when all of the three judgments are cleared, the situation of the procedure goes to the step 2002. When any one of the three judgments cannot be cleared, the situation of the procedure goes to the step 1006.

In adjustment of contact conditions between the sending and receiving sides in the step 2002, when the priority of the transmission condition is higher than the priority of the reception condition, for example, in the case where the sender expects "EXPRESS" as priority but the receiving side selects "ORDINARY" as priority in the reception condition, the priority ("EXPRESS" in the aforementioned example) and contact content in the transmission conditions are employed so that reception conditions except contact format and option designation are invalidated. When the priority of the transmission condition is not higher than the priority of the reception condition, the transmission conditions are invalidated so that processing is executed only in accordance with the reception conditions in the same manner as in the embodiment shown in FIG. 19.

By the aforementioned configuration and operation, when the emergency of a transmission message is high, transmission/reception contact condition adjustment using contact conditions on the sending side can be performed. Accordingly, message routing automatically adjusted in accordance with priority can be provided so that request conditions on the sending side are reflected or conditions on the receiving side are reflected in accordance with the priority.

What is claimed is:

1. A computer-telephony integration system for transmitting information from an arbitrary information sending source to a specific receiving-side subject which is a destination of information transmission, said system comprising:

a reception-environment-information registration means for registering reception-environment information including, at least, contact-enabled-means information for indicating means allowed to receive information, contact-point information for designating a contact point of means allowed to receive information, and reception-condition information for indicating a condition of information reception at said contact point, in accordance with an original destination in each of receiving-side subjects of information reception;

contact adjustment means for performing contact adjustment by referring to said reception-environment information when information destined for any one of said receiving-side subjects arrives to thereby acquire the contact-enabled-means information and contact-point information which can be received at the destined receiving-side subject, making judgment as to whether or not said arrived information satisfies a reception condition indicated by said reception-condition information of said receiving-side subject, and converting said arrived information so as to satisfy said reception condition and transmitting said converted information to said contact point; and said conversion by said contact adjustment means from said arrived information into said converted information including media conversion determined by selecting one from at least conversion from speech to text, conversion from text to speech and conversion from image to speech, wherein said reception-environment-information registration means includes storage means for storing reception-environment information, and means for accepting a reception-environment-information setting operation from the outside of said system, wherein said means for accepting a reception-environment-information setting operation has a function for displaying a reception-environment-information setting screen to carry out said reception-environment-information setting operation, a function for accepting an input in accordance with said screen, and a function for making said storage means store reception-environment setting data set by said accepted input; and said function for displaying a reception-environment-information setting screen displays a screen on which at least reception-condition information can be inputted, and wherein said function for displaying a reception-environment-information setting screen displays a screen on which at least one kind of information among priority information for indicating priority in processing of information to be transmitted, connection-format information for indicating a timelike-connection format of information transmission containing an instruction as to whether said information to be transmitted must be transmitted immediately or not, language information for indicating whether said information to be transmitted is required to be translated or not, contact-content information for indicating the degree of the contact content of said information to be transmitted, and transfer-route information for designating a transfer route can be inputted.

2. A computer-telephony integration system according to claim 1, wherein:
said system further comprises communication means for performing data communication with an information processing apparatus in the outside of said system; and
said means for accepting a reception-environment-information setting operation has a function for transmitting programs and data to a requester through said communication means to carry out said function for displaying a reception-environment-information setting screen and said function for accepting an input in accordance with said screen when a reception-environment-information setting request is accepted from the outside of said system, and further has a function for receiving said reception-environment setting data from said requester through said communication means and delivering said data to said function for making said storage means store information.

3. A computer-telephony integration system for transmitting information from an arbitrary information sending source to a specific receiving-side subject which is a destination of information transmission, said system comprising:
a reception-environment-information registration means for registering reception-environment information including, at least, contact-enabled-means information for indicating means allowed to receive information, contact-point information for designating a contact point of means allowed to receive information, and reception-condition information for indicating a condition of information reception at said contact point, in accordance with an original destination in each of receiving-side subjects of information reception;
contact adjustment means for performing contact adjustment by referring to said reception-environment information when information destined for any one of said receiving-side subjects arrives to thereby acquire the contact-enabled-means information and contact-point information which can be received at the destined receiving-side subject, making judgment as to whether or not said arrived information satisfies a reception condition indicated by said reception-condition information of said receiving-side subject, and converting said arrived information so as to satisfy said reception condition and transmitting said converted information to said contact point; and
said conversion by said contact adjustment means from said arrived information into said converted information including media conversion determined by selecting one from at least conversion from speech to text, conversion from text to speech and conversion from image to speech,
wherein said system further comprises transmission-environment-information registration means for setting an environment condition in the information sending side in accordance with an original destination in each of receiving-side subjects; and
said transmission-environment-information registration means includes a storage means for storing transmission-environment information, and means for accepting a transmission-environment-information setting operation from the outside of said system.

4. A computer-telephony integration system according to claim 3, wherein said means for accepting a transmission-environment-information setting operation has a function for setting a contact condition of the information sending side selectively from the range of reception-environment information registered by said reception-environment-information registration means.

5. A computer-telephony integration system according to claim 3, wherein:
said means for accepting a transmission-environment-information setting operation has a function for displaying a transmission-environment-information setting screen to carry out said transmission-environment-information setting operation, a function for accepting an input in accordance with said screen, and a function for making said storage means store transmission-environment setting data set by the accepted input;
said function for displaying a transmission-environment-information setting screen displays a screen on which at least transmission-request-condition information for indicating a condition requested by the sending side can be inputted.

6. A computer-telephony integration system according to claim 4, wherein:
said means for accepting a transmission-environment-information setting operation has a function for displaying a transmission-environment-information setting screen to carry out said transmission-environment-information setting operation, a function for accepting an input in accordance with said screen, and a function for making said storage means store transmission-environment setting data set by the accepted input;
said function for displaying a transmission-environment-information setting screen displays a screen on which at least transmission-request-condition information for indicating a condition requested by the sending side can be inputted.

7. A computer-telephony integration system according to claim 3, wherein, when a transmission-environment-condition information is set, said contact adjustment means judges whether said transmission-environment condition accords with said reception-environment condition so that said contact adjustment means performs contact adjustment on the basis of a condition of ORing said transmission-environment condition and said reception-environment condition when said transmission-environment condition accords with said reception-environment condition and said contact adjustment means performs contact adjustment in accordance with said reception-environment condition when said transmission-environment condition does not accord with said reception-environment condition.

8. A computer-telephony integration system according to claim 4, wherein, when a transmission-environment-condition information is set, said contact adjustment means judges whether said transmission-environment condition accords with said reception-environment condition so that said contact adjustment means performs contact adjustment on the basis of a condition of ORing said transmission-environment condition and said reception-environment condition when said transmission-environment condition accords with said reception-environment condition and said contact adjustment means performs contact adjustment in accordance with said reception-environment condition when said transmission-environment condition does not accord with said reception-environment condition.

9. A computer-telephony integration system for transmitting information from an arbitrary information sending source to a specific receiving-side subject which is a destination of information transmission, said system comprising:

a reception-environment-information registration means for registering reception-environment information including, at least, contact-enabled-means information for indicating means allowed to receive information, contact-point information for designating a contact point of means allowed to receive information, and reception-condition information for indicating a condition of information reception at said contact point, in accordance with an original destination in each of receiving-side subjects of information reception;

contact adjustment means for performing contact adjustment by referring to said reception-environment information when information destined for any one of said receiving-side subjects arrives to thereby acquire the contact-enabled-means information and contact-point information which can be received at the destined receiving-side subject, making judgment as to whether or not said arrived information satisfies a reception condition indicated by said reception-condition information of said receiving-side subject, and converting said arrived information so as to satisfy said reception condition and transmitting said converted information to said contact point; and said conversion by said contact adjustment means from said arrived information into said converted information including media conversion determined by selecting one from at least conversion from speech to text, conversion from text to speech and conversion from image to speech, wherein said system further comprises a transmission-environment-information registration means for setting an environment condition in the information sending side in accordance with an original destination in each of said receiving-side subjects;

said transmission-environment-information registration means includes a storage means for storing transmission-environment information, and means for accepting a transmission-environment- information setting operation from the outside of said system;

said means for accepting a reception-environment-information setting operation has a function for displaying a reception-environment-information setting screen to carry out said reception-environment-information setting operation, a function for accepting an input in accordance with said screen, and a function for making said storage means store reception-environment setting data set by the accepted input;

said function for displaying a reception-environment-information setting screen displays a screen on which, among priority information for indicating priority in processing of information to be transmitted, connection-format information for indicating a timelike connection format of information transmission containing an instruction as to whether said information to be transmitted must be transmitted immediately or not, option information concerning said information to be transmitted, contact-content information for indicating the degree of the contact content of said information to be transmitted and transfer-route information for designating a transfer route, at least the priority information and the contact-content information can be inputted as said reception condition;

said means for accepting a transmission-environment-information setting operation has a function for displaying a transmission-environment-information setting screen to carry out said transmission-environment-information setting operation, a function for accepting an input in accordance with said screen, and a function for making said storage means store transmission-environment setting data set by the accepted input;

said function for displaying a transmission-environment-information setting screen displays a screen on which at least transmission-request-condition information, priority information for indicating priority in processing of information to be transmitted and contact content information for indicating the degree of the contact content of said information to be transmitted can be inputted as a condition requested by the sending side; and said contact adjustment means further has a function for comparing priority in the transmission-environment condition with priority in the reception-environment condition when a requested reception subject set in said transmission-environment-condition information can be contacted so that said contact adjustment means performs contact adjustment in accordance with the setting in the transmission-environment condition with respect to both said priority and said contact content when the transmission-environment condition has higher priority.

10. A computer-telephony integration system for transmitting information from an arbitrary information sending source to a specific receiving-side subject which is a destination of information transmission, said system comprising:

a reception-environment-information registration means for registering reception-environment information including, at least, contact-enabled-means information for indicating means allowed to receive information, contact-point information for designating a contact point of means allowed to receive information, and reception-condition information for indicating a condition of information reception at said contact point, in accordance with an original destination in each of receiving-side subjects of information reception;

contact adjustment means for performing contact adjustment by referring to said reception-environment information when information destined for any one of said receiving-side subjects arrives to thereby acquire the contact-enabled-means information and contact-point information which can be received at the destined receiving-side subject, making judgment as to whether or not said arrived information satisfies a reception condition indicated by said reception-condition information of said receiving-side subject, and converting said arrived information so as to satisfy said reception condition and transmitting said converted information to said contact point; and said conversion by said contact adjustment means from said arrived information into said converted information including media conversion determined by selecting one from at least conversion from speech to text, conversion from text to speech and conversion from image to speech, wherein said system further comprises a transmission-environment-information registration means for setting an environment condition in the information sending side in accordance with an original destination in each of said receiving-side subjects;

said transmission-environment-information registration means includes a storage means for storing transmission-environment information, and means for accepting a transmission-environment- information setting operation from the outside of said system;

said means for accepting a reception-environment-information setting operation has a function for displaying a reception-environment-information setting screen to carry out said reception-environment-information setting operation, a function for accepting an input in accordance with said screen, and a function for making said storage means store reception-environment setting data set by the accepted input;

said function for displaying a reception-environment-information setting screen displays a screen on which, among priority information for indicating priority in processing of information to be transmitted, connection-format information for indicating a timelike connection format of information transmission containing an instruction as to whether said information to be transmitted must be transmitted immediately or not, option information concerning said information to be transmitted, contact-content information for indicating the degree of the contact content of said information to be transmitted and transfer-route information for designating a transfer route, at least the priority information and the contact-content information can be inputted as said reception condition;

said means for accepting a transmission-environment-information setting operation has a function for displaying a transmission-environment-information setting screen to carry out said transmission-environment-information setting operation, a function for accepting an input in accordance with said screen, and a function for making said storage means store transmission-environment setting data set by the accepted input;

said function for displaying a transmission-environment-information setting screen displays a screen on which at least transmission-request-condition information, priority information for indicating priority in processing of information to be transmitted and contact content information for indicating the degree of the contact content of said information to be transmitted can be inputted as a condition requested by the sending side; and said contact adjustment means further has a function for comparing priority in the transmission-environment condition with priority in the reception-environment condition when a requested reception subject set in said transmission-environment-condition information can be contacted so that said contact adjustment means performs contact adjustment in accordance with the setting in the transmission-environment condition with respect to both said priority and said contact content when the transmission-environment condition has higher priority, wherein both an appliance used by a human being and a work processing system for performing work processing are said receiving-side subjects.

11. A computer-telephony integration system for transmitting information from an arbitrary information sending source to a specific receiving-side subject which is a destination of information transmission, said system comprising:

a reception-environment-information registration means for registering reception-environment information including, at least, contact-enabled-means information for indicating means allowed to receive information, contact-point information for designating a contact point of means allowed to receive information, and reception-condition information for indicating a condition of information reception at said contact point, in accordance with an original destination in each of receiving-side subjects of information reception;

contact adjustment means for performing contact adjustment by referring to said reception-environment information when information destined for any one of said receiving-side subjects arrives to thereby acquire the contact-enabled-means information and contact-point information which can be received at the destined receiving-side subject, making judgment as to whether or not said arrived information satisfies a reception condition indicated by said reception-condition information of said receiving-side subject, and converting said arrived information so as to satisfy said reception condition and transmitting said converted information to said contact point; and transmission-environment-information registration means for setting an environment condition in the information sending side in accordance with an original destination in each of receiving-side subjects; said transmission-environment-information registration means including a storage means for storing transmission-environment-information, and means for accepting a transmission-environment-information setting operation from the outside of said system, wherein, when a transmission-environment-condition information is set, said contact adjustment means judges whether said transmission-environment condition accords with said reception-environment condition so that said contact adjustment means performs contact adjustment on the basis of a condition of ORing said transmission-environment condition and said reception-environment condition when said transmission-environment condition accords with said reception-environment condition and said contact adjustment means performs contact adjustment in accordance with said reception-environment condition when said transmission-environment condition does not accord with said reception-environment condition.

12. A computer-telephony integration system for transmitting information from an arbitrary information sending source to a specific receiving-side subject which is a destination of information transmission, said system comprising:

a reception-environment-information registration means for registering reception-environment information including, at least, contact-enabled-means information for indicating means allowed to receive information, contact-point information for designating a contact point of means allowed to receive information, and reception-condition information for indicating a condition of information reception at said contact point, in accordance with an original destination in each of receiving-side subjects of information reception;

contact adjustment means for performing contact adjustment by referring to said reception-environment information when information destined for any one of said receiving-side subjects arrives to thereby acquire the contact-enabled-means information and contact-point information which can be received at the destined receiving-side subject, making judgment as to whether or not said arrived information satisfies a reception condition indicated by said reception-condition information of said receiving-side subject, and converting said arrived information so as to satisfy said reception condition and transmitting said converted information to said contact point; and transmission-environment-information registration means for setting an environment condition in the information sending side in accordance with an original destination in each of receiving-side subjects; said transmission-environment-information registration means including a storage means for storing transmission-environment-information, and means for accepting a transmission-environment-information setting operation from the outside of said system, wherein said means for accepting a transmission-environment-information setting operation has a function for setting a contact condition of the information sending side selectively from the range of reception-environment information registered by said reception-environment-information registration means, and wherein, when a transmission-environment-condition information is set, said contact adjustment means judges whether said transmission-environment condition accords with said reception-environment condition so that said contact adjustment means performs contact adjustment on the basis of a condition of ORing said transmission-environment condition and said reception-environment condition when said transmission-environment condition accords with said reception environment condition and said contact adjustment means performs contact adjustment in accordance with said reception-environment condition when said transmission-environment condition does not accord with said reception-environment condition.

13. A computer-telephony integration system for transmitting information from an arbitrary information sending source to a specific receiving-side subject which is a destination of information transmission, said system comprising:

a reception-environment-information registration means for registering reception-environment information including, at least, contact-enabled-means information for indicating means allowed to receive information, contact-point information for designating a contact point of means allowed to receive information, and reception-condition information for indicating a condition of information reception at said contact point, in accordance with an original destination in each of receiving-side subjects of information reception;

contact adjustment means for performing contact adjustment by referring to said reception-environment information when information destined for any one of said receiving-side subjects arrives to thereby acquire the contact-enabled-means information and contact-point information which can be received at the destined receiving-side subject, making judgment as to whether or not said arrived information satisfies a reception condition indicated by said reception-condition information of said receiving-side subject, and converting said arrived information so as to satisfy said reception condition and transmitting said converted information to said contact point;

a transmission-environment-information registration means for setting an environment condition in the information sending side in accordance with an original destination in each of said receiving-side subjects;

said transmission-environment-information registration means including a storage means for storing transmission-environment information, and means for accepting a transmission-environment- information setting operation from the outside of said system;

said means for accepting a reception-environment-information setting operation has a function for displaying a reception-environment-information setting screen to carry out said reception-environment-information setting operation, a function for accepting an input in accordance with said screen, and a function for making said storage means store reception-environment setting data set by the accepted input;

said function for displaying a reception-environment-information setting screen displays a screen on which, among priority information for indicating priority in processing of information to be transmitted, connection-format information for indicating a timelike connection format of information transmission containing an instruction as to whether said information to be transmitted must be transmitted immediately or not, option information concerning said information to be transmitted, contact-content information for indicating the degree of the contact content of said information to be transmitted and transfer-route information for designating a transfer route, at least the priority information and the contact-content information can be inputted as said reception condition;

said means for accepting a transmission-environment-information setting operation has a function for displaying a transmission-environment-information setting screen to carry out said transmission-environment-information setting operation, a function for accepting an input in accordance with said screen, and a function for making said storage means store transmission-environment setting data set by the accepted input;

said function for displaying a transmission-environment-information setting screen displays a screen on which at least transmission-request-condition information, priority information for indicating priority in processing of information to be transmitted and contact content information for indicating the degree of the contact content of said information to be transmitted can be inputted as a condition requested by the sending side; and said contact adjustment means further has a function for comparing priority in the transmission-environment condition with priority in the reception-environment condition when a requested reception subject set in said transmission-environment-condition information can be contacted so that said contact adjustment means performs contact adjustment in accordance with the setting in the transmission-environment condition with respect to both said priority and said contact content when the transmission-environment condition has higher priority.

14. A computer-telephony integration system for transmitting information from an arbitrary information sending source to a specific receiving-side subject which is a destination of information transmission, said system comprising:

a reception-environment-information registration means for registering reception-environment information including, at least, contact-enabled-means information for indicating means allowed to receive information, contact-point information for designating a contact point of means allowed to receive information, and reception-condition information for indicating a condition of information reception at said contact point, in accordance with an original destination in each of receiving-side subjects of information reception;

contact adjustment means for performing contact adjustment by referring to said reception-environment information when information destined for any one of said receiving-side subjects arrives to thereby acquire the contact-enabled-means information and contact-point information which can be received at the destined receiving-side subject, making judgment as to whether or not said arrived information satisfies a reception condition indicated by said reception-condition information of said receiving-side subject, and converting said arrived information so as to satisfy said reception condition and transmitting said converted information to said contact point, said system further comprises a transmission-environment-information registration means for setting an environment condition in the information sending side in accordance with an original destination in each of said receiving-side subjects;

said transmission-environment-information registration means includes a storage means for storing transmission-environment information, and means for accepting a transmission-environment-information setting operation from the outside of said system;

said means for accepting a reception-environment-information setting operation has a function for displaying a reception-environment-information setting screen to carry out said reception-environment-information setting operation, a function for accepting an input in accordance with said screen, and a function for making said storage means store reception-environment setting data set by the accepted input;

said function for displaying a reception-environment-information setting screen displays a screen on which, among priority information for indicating priority in processing of information to be transmitted, connection-format information for indicating a timelike connection format of information transmission containing an instruction as to whether said information to be transmitted must be transmitted immediately or not, option information concerning said information to be transmitted, contact-content information for indicating the degree of the contact content of said information to be transmitted and transfer-route information for designating a transfer route, at least the priority information and the contact-content information can be inputted as said reception condition;

said means for accepting a transmission-environment-information setting operation has a function for displaying a transmission-environment-information setting screen to carry out said transmission-environment-information setting operation, a function for accepting an input in accordance with said screen, and a function for making said storage means store transmission-environment setting data set by the accepted input;

said function for displaying a transmission-environment-information setting screen displays a screen on which at least transmission-request-condition information, priority information for indicating priority in processing of information to be transmitted and contact content information for indicating the degree of the contact content of said information to be transmitted can be inputted as a condition requested by the sending side; and said contact adjustment means further has a function for comparing priority in the transmission-environment condition with priority in the reception-environment condition when a requested reception subject set in said transmission-environment-condition information can be contacted so that said contact adjustment means performs contact adjustment in accordance with the setting in the transmission-environment condition with respect to both said priority and said contact content when the transmission-environment condition has higher priority, wherein both an appliance used by a human being and a work processing system for performing work processing are said receiving-side subjects.

15. A computer-telephony integration system for transmitting information from an arbitrary information sending source to a specific receiving-side subject which is a destination of information transmission, said system comprising:

a reception-environment-information registration means for registering reception-environment information including, at least, contact-enabled-means information for indicating means allowed to receive information, contact-point information for designating a contact point of means allowed to receive information, and reception-condition information for indicating a condition of information reception at said contact point, in accordance with an original destination in each of receiving-side subjects of information reception;

contact adjustment means for performing contact adjustment by referring to said reception-environment information when information destined for any one of said receiving-side subjects arrives to thereby acquire the contact-enabled-means information and contact-point information which can be received at the destined receiving-side subject, making judgment as to whether or not said arrived information satisfies a reception condition indicated by said reception-condition information of said receiving-side subject, and converting said arrived information so as to satisfy said reception condition and transmitting said converted information to said contact point, wherein said reception-environment-information registration means includes storage means for storing reception-environment information, and means for accepting a reception-environment-information setting operation from the outside of said system, wherein said means for accepting a reception-environment-information setting operation has a function for displaying a reception-environment-information setting screen to carry out said reception-environment-information setting operation, a function for accepting an input in accordance with said screen, and a function for making said storage means store reception-environment setting data set by said accepted input, said function for displaying a reception-environment-information setting screen displays a screen on which at least reception-condition information can be inputted, wherein said function for displaying a reception-environment-information setting screen displays a screen on which at least one kind of information among priority information for indicating priority in processing of information to be transmitted, connection-format information for indicating a time-like-connection format of information transmission containing an instruction as to whether said information to be transmitted must be transmitted immediately or not, language information for indicating whether said information to be transmitted is required to be translated or not, contact-content information for indicating the degree of the contact content of said information to be transmitted, and transfer-route information for designating a transfer route can be inputted, wherein said system further comprises a schedule management means for managing a schedule for each reception subject; and said means for accepting a reception-environment-information setting operation further has a function for setting reception-environment information with respect to said reception subject in cooperation with said schedule management means.

16. A computer-telephony integration system for transmitting information from an arbitrary information sending source to a specific receiving-side subject which is a destination of information transmission, said system comprising:

a reception-environment-information registration means for registering reception-environment information including, at least, contact-enabled-means information for indicating means allowed to receive information, contact-point information for designating a contact point of means allowed to receive information, and reception-condition information for indicating a condition of information reception at said contact point, in accordance with an original destination in each of receiving-side subjects of information reception;

contact adjustment means for performing contact adjustment by referring to said reception-environment information when information destined for any one of said receiving-side subjects arrives to thereby acquire the contact-enabled-means information and contact-point information which can be received at the destined receiving-side subject, making judgment as to whether or not said arrived information satisfies a reception condition indicated by said reception-condition information of said receiving-side subject, and converting said arrived information so as to satisfy said reception condition and transmitting said converted information to said contact point; and transmission-environment-information registration means for setting an environment condition in the information sending side in accordance with an original destination in each of receiving-side subjects; said transmission-environment-information registration means including a storage means for storing transmission-environment-information, and means for accepting a transmission-environment-information setting operation from the outside of said system, said conversion by said contact adjustment means from said arrived information into said converted information including media conversion determined by selecting one from at least conversion from speech to text, conversion from text to speech and conversion from image to speech, wherein when a transmission-environment-condition information is set, said contact adjustment means judges whether said transmission-environment condition accords with said reception-environment condition so that said contact adjustment means performs contact adjustment on the basis of a condition of ORing said transmission-environment condition and said reception-environment condition when said transmission-environment condition accords with said reception-environment condition and said contact adjustment means performs contact adjustment in accordance with said reception-environment condition when said transmission-environment condition does not accord with said reception-environment condition.

17. A computer-telephony integration system for transmitting information from an arbitrary information sending source to a specific receiving-side subject which is a destination of information transmission, said system comprising:

a reception-environment-information registration means for registering reception-environment information including, at least, contact-enabled-means information for indicating means allowed to receive information, contact-point information for designating a contact point of means allowed to receive information, and reception-condition information for indicating a condition of information reception at said contact point, in accordance with an original destination in each of receiving-side subjects of information reception;

contact adjustment means for performing contact adjustment by referring to said reception-environment information when information destined for any one of said receiving-side subjects arrives to thereby acquire the contact-enabled-means information and contact-point information which can be received at the destined receiving-side subject, making judgment as to whether or not said arrived information satisfies a reception condition indicated by said reception-condition information of said receiving-side subject, and converting said arrived information so as to satisfy said reception condition and transmitting said converted information to said contact point; and transmission-environment-information registration means for setting an environment condition in the information sending side in accordance with an original destination in each of receiving-side subjects; said transmission-environment-information registration means including a storage means for storing transmission-environment information, and means for accepting a transmission-environment-information setting operation from the outside of said system, said conversion by said contact adjustment means from said arrived information into said converted information including media conversion determined by selecting one from at least conversion from speech to text, conversion from text to speech and conversion from image to speech, wherein said means for accepting a transmission-environment-information setting operation has a function for setting a contact condition of the information sending side selectively from the range of reception-environment information registered by said reception-environment-information registration means, and wherein, when a transmission-environment-condition information is set, said contact adjustment means judges whether said transmission-environment condition accords with said reception-environment condition so that said contact adjustment means performs contact adjustment on the basis of a condition of ORing said transmission-environment condition and said reception-environment condition when said transmission-environment condition accords with said reception environment condition and said contact adjustment means performs contact adjustment in accordance with said reception-environment condition when said transmission-environment condition does not accord with said reception-environment condition.

18. A computer-telephony integration system for transmitting information from an arbitrary information sending source to a specific receiving-side subject which is a destination of information transmission, said system comprising:

a reception-environment-information registration means for registering reception-environment information including, at least, contact-enabled-means information for indicating means allowed to receive information, contact-point information for designating a contact point of means allowed to receive information, and reception-condition information for indicating a condition of information reception at said contact point, in accordance with an original destination in each of receiving-side subjects of information reception;

contact adjustment means for performing contact adjustment by referring to said reception-environment information when information destined for any one of said receiving-side subjects arrives to thereby acquire the contact-enabled-means information and contact-point information which can be received at the destined receiving-side subject, making judgment as to whether or not said arrived information satisfies a reception condition indicated by said reception-condition information of said receiving-side subject, and converting said arrived information so as to satisfy said reception condition and transmitting said converted information to said contact point;

said conversion by said contact adjustment means from said arrived information into said converted information including media conversion determined by selecting one from at least conversion from speech to text, conversion from text to speech and conversion from image to speech, a transmission-environment-information registration means for setting an environment condition in the information sending side in accordance with an original destination in each of said receiving-side subjects;

said transmission-environment-information registration means including a storage means for storing transmission-environment information, and means for accepting a transmission-environment- information setting operation from the outside of said system;

said means for accepting a reception-environment-information setting operation has a function for displaying a reception-environment-information setting screen to carry out said reception-environment-information setting operation, a function for accepting an input in accordance with said screen, and a function for making said storage means store reception-environment setting data set by the accepted input;

said function for displaying a reception-environment-information setting screen displays a screen on which, among priority information for indicating priority in processing of information to be transmitted, connection-format information for indicating a timelike connection format of information transmission containing an instruction as to whether said information to be transmitted must be transmitted immediately or not, option information concerning said information to be transmitted, contact-content information for indicating the degree of the contact content of said information to be transmitted and transfer-route information for designating a transfer route, at least the priority information and the contact-content information can be inputted as said reception condition;

said means for accepting a transmission-environment-information setting operation has a function for displaying a transmission-environment-information setting screen to carry out said transmission-environment-information setting operation, a function for accepting an input in accordance with said screen, and a function for making said storage means store transmission-environment setting data set by the accepted input;

said function for displaying a transmission-environment-information setting screen displays a screen on which at least transmission-request-condition information, priority information for indicating priority in processing of information to be transmitted and contact content information for indicating the degree of the contact content of said information to be transmitted can be inputted as a condition requested by the sending side; and said contact adjustment means further has a function for comparing priority in the transmission-environment condition with priority in the reception-environment condition when a requested reception subject set in said transmission-environment-condition information can be contacted so that said contact adjustment means performs contact adjustment in accordance with the setting in the transmission-environment condition with respect to both said priority and said contact content when the transmission-environment condition has higher priority.

19. A computer-telephony integration system for transmitting information from an arbitrary information sending source to a specific receiving-side subject which is a destination of information transmission, said system comprising:

a reception-environment-information registration means for registering reception-environment information including, at least, contact-enabled-means information for indicating means allowed to receive information, contact-point information for designating a contact point of means allowed to receive information, and reception-condition information for indicating a condition of information reception at said contact point, in accordance with an original destination in each of receiving-side subjects of information reception;

contact adjustment means for performing contact adjustment by referring to said reception-environment information when information destined for any one of said receiving-side subjects arrives to thereby acquire the contact-enabled-means information and contact-point information which can be received at the destined receiving-side subject, making judgment as to whether or not said arrived information satisfies a reception condition indicated by said reception-condition information of said receiving-side subject, and converting said arrived information so as to satisfy said reception condition and transmitting said converted information to said contact point, said conversion by said contact adjustment means from said arrived information into said converted information including media conversion determined by selecting one from at least conversion from speech to text, conversion from text to speech and conversion from image to speech, said system further comprises a transmission-environment-information registration means for setting an environment condition in the information sending side in accordance with an original destination in each of said receiving-side subjects;

said transmission-environment-information registration means includes a storage means for storing transmission-environment information, and means for accepting a transmission-environment- information setting operation from the outside of said system;

said means for accepting a reception-environment-information setting operation has a function for displaying a reception-environment-information setting screen to carry out said reception-environment-information setting operation, a function for accepting an input in accordance with said screen, and a function for making said storage means store reception-environment setting data set by the accepted input;

said function for displaying a reception-environment-information setting screen displays a screen on which, among priority information for indicating priority in processing of information to be transmitted, connection-format information for indicating a timelike connection format of information transmission containing an instruction as to whether said information to be transmitted must be transmitted immediately or not, option information concerning said information to be transmitted, contact-content information for indicating the degree of the contact content of said information to be transmitted and transfer-route information for designating a transfer route, at least the priority information and the contact-content information can be inputted as said reception condition;

said means for accepting a transmission-environment-information setting operation has a function for displaying a transmission-environment-information setting screen to carry out said transmission-environment-information setting operation, a function for accepting an input in accordance with said screen, and a function for making said storage means store transmission-environment setting data set by the accepted input;

said function for displaying a transmission-environment-information setting screen displays a screen on which at least transmission-request-condition information, priority information for indicating priority in processing of information to be transmitted and contact content information for indicating the degree of the contact content of said information to be transmitted can be inputted as a condition requested by the sending side; and said contact adjustment means further has a function for comparing priority in the transmission-environment condition with priority in the reception-environment condition when a requested reception subject set in said transmission-environment-condition information can be contacted so that said contact adjustment means performs contact adjustment in accordance with the setting in the transmission-environment condition with respect to both said priority and said contact content when the transmission-environment condition has higher priority, wherein both an appliance used by a human being and a work processing system for performing work processing are said receiving-side subjects.

20. A computer-telephony integration system for transmitting information from an arbitrary information sending source to a specific receiving-side subject which is a destination of information transmission, said system comprising:

a reception-environment-information registration means for registering reception-environment information including, at least, contact-enabled-means information for indicating means allowed to receive information, contact-point information for designating a contact point of means allowed to receive information, and reception-condition information for indicating a condition of information reception at said contact point, in accordance with an original destination in each of receiving-side subjects of information reception;

contact adjustment means for performing contact adjustment by referring to said reception-environment information when information destined for any one of said receiving-side subjects arrives to thereby acquire the contact-enabled-means information and contact-point information which can be received at the destined receiving-side subject, making judgment as to whether or not said arrived information satisfies a reception condition indicated by said reception-condition information of said receiving-side subject, and converting said arrived information so as to satisfy said reception condition and transmitting said converted information to said contact point, said conversion by said contact adjustment means from said arrived information into said converted information including media conversion determined by selecting one from at least conversion from speech to text, conversion from text to speech and conversion from image to speech, wherein said reception-environment-information registration means includes storage means for storing reception-environment information, and means for accepting a reception-environment-information setting operation from the outside of said system, wherein said means for accepting a reception-environment-information setting operation has a function for displaying a reception-environment-information setting screen to carry out said reception-environment-information setting operation, a function for accepting an input in accordance with said screen, and a function for making said storage means store reception-environment setting data set by said accepted input, said function for displaying a reception-environment-information setting screen displays a screen on which at least reception-condition information can be inputted, wherein said function for displaying a reception-environment-information setting screen displays a screen on which at least one kind of information among priority information for indicating priority in processing of information to be transmitted, connection-format information for indicating a time-like-connection format of information transmission containing an instruction as to whether said information to be transmitted must be transmitted immediately or not, language information for indicating whether said information to be transmitted is required to be translated or not, contact-content information for indicating the degree of the contact content of said information to be transmitted, and transfer-route information for designating a transfer route can be inputted, wherein said system further comprises a schedule management means for managing a schedule for each reception subject; and said means for accepting a reception-environment-information setting operation further has a function for setting reception-environment information with respect to said reception subject in cooperation with said schedule management means.

* * * * *